United States Patent
Christmas et al.

(10) Patent No.: US 11,985,244 B2
(45) Date of Patent: May 14, 2024

(54) SYSTEMS AND METHODS FOR IMPROVED DATA ENCRYPTION

(71) Applicant: Fasetto, LLC, Superior, WI (US)

(72) Inventors: Coy Christmas, Superior, WI (US); Luke Malpass, Stoke-on-Trent (GB)

(73) Assignee: FASETTO, INC., Scottsdale, AZ (US)

( * ) Notice: Subject to any disclaimer, the term of this patent is extended or adjusted under 35 U.S.C. 154(b) by 147 days.

(21) Appl. No.: 16/206,675

(22) Filed: Nov. 30, 2018

(65) Prior Publication Data
US 2019/0173677 A1 Jun. 6, 2019

Related U.S. Application Data

(60) Provisional application No. 62/593,603, filed on Dec. 1, 2017.

(51) Int. Cl.
*H04L 9/32* (2006.01)
*G06F 21/60* (2013.01)
(Continued)

(52) U.S. Cl.
CPC .......... *H04L 9/3226* (2013.01); *G06F 21/602* (2013.01); *H04L 9/0656* (2013.01); *H04L 9/0897* (2013.01)

(58) Field of Classification Search
CPC ... H04L 9/3226; H04L 9/0631; H04L 9/0656; H04L 9/06; H04L 9/0618; H04L 9/065;
(Continued)

(56) References Cited

U.S. PATENT DOCUMENTS 5,003,596 A * 3/1991 Wood ............... H04L 9/002
                                                380/264
5,246,564 A    9/1993 Tamiya et al.
(Continued)

FOREIGN PATENT DOCUMENTS

AU    2013352236    11/2018
CN    103945003     7/2001
(Continued)

OTHER PUBLICATIONS

Bormann, G. (May 16, 2008). DE102008023577A1—Symmetrical algorithm for coding and decoding of byte sequences, has byte sequence encoded or decoded in block with variable long key, where byte sequence is extended to certain length, https://patents.google.com/patent/DE1 (Year: 2008).*
(Continued)

*Primary Examiner* — Robert B Leung
(74) *Attorney, Agent, or Firm* — SNELL & WILMER L.L.P.

(57) ABSTRACT

Systems and methods for improved data encryption are provided. The improved data encryption processes may be applied to stored data or transmitted data, and/or may be applied to data on a portable storage device. The system may receive a password input to encrypt a data file. The system may retrieve math functions based on each byte in the password input. The system may apply each math function in turn to each byte in the data file. The application of each math function to the data file may be repeated. The position of the bytes in the data file may be transposed and filler bytes may be added to the data file. The system may also adjust the starting byte position of the data file.

20 Claims, 18 Drawing Sheets

(51) Int. Cl.
   *H04L 9/06*          (2006.01)
   *H04L 9/08*          (2006.01)
(58) Field of Classification Search
   CPC ... H04L 9/0897; H04L 9/3239; H04L 9/0863;
        G06F 21/602; G06F 21/60; G06F 21/606;
        G06F 21/62; G06F 21/64; G06F 21/46;
        G06F 2221/2107
   See application file for complete search history.

(56) References Cited

U.S. PATENT DOCUMENTS

| | | |
|---|---|---|
| 5,303,388 A | 4/1994 | Kreitman et al. |
| 5,590,024 A | 12/1996 | Honda et al. |
| 5,664,228 A | 9/1997 | Mital |
| 5,678,015 A | 10/1997 | Goh |
| 5,689,287 A | 11/1997 | Mackinlay et al. |
| 5,689,654 A | 11/1997 | Kikinis et al. |
| 5,729,471 A | 3/1998 | Jain et al. |
| 5,861,873 A | 1/1999 | Kikinis |
| 5,956,038 A | 9/1999 | Rekimoto |
| 5,963,215 A | 10/1999 | Rosenzweig |
| 5,982,295 A | 11/1999 | Goto et al. |
| 6,002,403 A | 12/1999 | Sugiyama et al. |
| 6,008,809 A | 12/1999 | Brooks |
| 6,029,183 A | 2/2000 | Jenkins et al. |
| 6,160,488 A | 12/2000 | Honda |
| 6,489,932 B1 | 12/2002 | Chitturi et al. |
| 6,497,367 B2 | 12/2002 | Conzola et al. |
| 6,581,068 B1 | 6/2003 | Bensoussan |
| 6,597,358 B2 | 7/2003 | Miller |
| 6,652,170 B1 | 11/2003 | Arnold |
| 6,710,788 B1 | 3/2004 | Freach et al. |
| 6,922,815 B2 | 7/2005 | Rosen |
| 6,938,218 B1 | 8/2005 | Rosen |
| 7,054,963 B2 | 5/2006 | Betts-LaCroix et al. |
| 7,134,095 B1 | 11/2006 | Smith et al. |
| 7,149,836 B2 | 12/2006 | Yu et al. |
| 7,216,305 B1 | 5/2007 | Jaeger |
| 7,428,702 B1 | 9/2008 | Cervantes et al. |
| 7,480,872 B1 | 1/2009 | Ubillos |
| 7,516,484 B1 | 4/2009 | Arnouse |
| 7,533,408 B1 | 5/2009 | Arnouse |
| 7,725,839 B2 | 5/2010 | Michaels |
| 7,761,813 B2 | 7/2010 | Kim |
| D654,931 S | 2/2012 | Lemelman et al. |
| 8,111,255 B2 | 2/2012 | Park |
| 8,117,563 B2 | 2/2012 | Ok et al. |
| 8,264,488 B2 | 9/2012 | Ueno |
| 8,386,686 B2 | 2/2013 | Lin et al. |
| 8,390,255 B1 | 3/2013 | Fathollahi |
| 8,405,502 B2 | 3/2013 | Teague |
| 8,483,758 B2 | 7/2013 | Huang |
| 8,497,859 B1 | 7/2013 | Hickman et al. |
| 8,510,680 B2 | 8/2013 | Kang et al. |
| 8,587,590 B2 | 11/2013 | Erickson et al. |
| 8,614,885 B2 | 12/2013 | Solomon et al. |
| 8,634,883 B2 | 1/2014 | Hong |
| 8,699,218 B2 | 4/2014 | Xu |
| 8,745,535 B2 | 6/2014 | Chaudhri et al. |
| 8,810,430 B2 | 8/2014 | Proud |
| 8,924,862 B1 | 12/2014 | Luo |
| 8,935,438 B1 | 1/2015 | Ivanchenko |
| 8,942,371 B2 * | 1/2015 | Urbanik .............. H04L 9/14 380/28 |
| 8,952,566 B2 | 2/2015 | Harris |
| 8,996,795 B2 | 3/2015 | Mardiks et al. |
| 9,047,050 B2 | 6/2015 | Medica et al. |
| 9,100,685 B2 | 8/2015 | Conrad et al. |
| 9,178,976 B2 | 11/2015 | Djordjevic |
| 9,247,303 B2 | 1/2016 | Phang et al. |
| 9,288,295 B2 | 3/2016 | Ivanovski et al. |
| 9,356,267 B1 | 5/2016 | To et al. |
| 9,360,991 B2 | 6/2016 | Celebisoy |
| 9,378,588 B2 | 6/2016 | Song et al. |
| 9,390,082 B1 | 7/2016 | Stolte et al. |
| 9,405,435 B2 | 8/2016 | Hendricks |
| 9,437,038 B1 | 9/2016 | Costello et al. |
| 9,495,375 B2 | 11/2016 | Huang et al. |
| 9,516,151 B2 | 12/2016 | Moran et al. |
| 9,584,402 B2 | 2/2017 | Christmas et al. |
| 9,626,341 B1 | 4/2017 | Guan et al. |
| 9,658,651 B2 | 5/2017 | Balogh |
| 9,684,887 B2 | 6/2017 | Majeti et al. |
| 9,836,479 B2 | 12/2017 | Velummylum et al. |
| 9,886,229 B2 | 2/2018 | Christmas et al. |
| 10,075,502 B2 | 9/2018 | Malpass |
| 10,084,688 B2 | 9/2018 | Christmas et al. |
| 10,095,873 B2 | 10/2018 | Christmas et al. |
| 10,122,483 B2 | 11/2018 | Gonzales, Jr. |
| 10,123,153 B2 | 11/2018 | Christmas et al. |
| 10,193,587 B2 | 1/2019 | Li |
| 10,231,013 B2 | 3/2019 | Besehanic |
| 10,411,406 B1 | 9/2019 | Hill |
| 10,437,288 B2 | 10/2019 | Christmas et al. |
| 2001/0028369 A1 | 10/2001 | Gallo et al. |
| 2001/0033654 A1 | 10/2001 | Wieser |
| 2001/0044578 A1 | 11/2001 | Ben-Haim et al. |
| 2002/0085681 A1 | 7/2002 | Jensen |
| 2002/0105529 A1 | 8/2002 | Bowser et al. |
| 2002/0105551 A1 | 8/2002 | Kamen et al. |
| 2002/0138543 A1 | 9/2002 | Teng et al. |
| 2003/0014978 A1 | 1/2003 | Horii et al. |
| 2003/0031161 A1 * | 2/2003 | Froehlich .............. H04L 1/187 370/349 |
| 2003/0074529 A1 | 4/2003 | Crohas |
| 2003/0126272 A1 | 7/2003 | Cori et al. |
| 2003/0126335 A1 | 7/2003 | Silvester |
| 2003/0131050 A1 | 7/2003 | Vincent |
| 2003/0141978 A1 | 7/2003 | D'Agosto |
| 2003/0142136 A1 | 7/2003 | Carter et al. |
| 2003/0217097 A1 | 11/2003 | Eitel |
| 2004/0088280 A1 | 5/2004 | Koh et al. |
| 2004/0104932 A1 | 6/2004 | Brebner |
| 2004/0205091 A1 | 10/2004 | Mulcahy et al. |
| 2005/0005246 A1 | 1/2005 | Card et al. |
| 2005/0076216 A1 | 4/2005 | Nyberg |
| 2005/0097008 A1 | 5/2005 | Ehring et al. |
| 2005/0185364 A1 | 8/2005 | Bell et al. |
| 2005/0224589 A1 | 10/2005 | Park et al. |
| 2005/0237704 A1 | 10/2005 | Ceresoli |
| 2005/0271207 A1 | 12/2005 | Frey |
| 2006/0020888 A1 | 1/2006 | Kang et al. |
| 2006/0057960 A1 | 3/2006 | Tran |
| 2006/0075225 A1 | 4/2006 | Flynn et al. |
| 2006/0085741 A1 | 4/2006 | Weiner et al. |
| 2006/0090122 A1 | 4/2006 | Pyhalammi et al. |
| 2006/0112270 A1 | 5/2006 | Erez |
| 2006/0130004 A1 | 6/2006 | Hughes et al. |
| 2006/0134997 A1 | 6/2006 | Curtis et al. |
| 2006/0149825 A1 | 7/2006 | Kim |
| 2006/0159028 A1 | 7/2006 | Curran-Gray |
| 2006/0161631 A1 | 7/2006 | Lira |
| 2006/0193472 A1 * | 8/2006 | Yuen .................. H04L 9/065 380/274 |
| 2006/0200518 A1 | 9/2006 | Sinclair et al. |
| 2006/0239275 A1 | 10/2006 | Zlateff et al. |
| 2006/0239375 A1 | 10/2006 | Kim et al. |
| 2006/0294386 A1 | 12/2006 | Yuval et al. |
| 2007/0050778 A1 | 3/2007 | Lee et al. |
| 2007/0058806 A1 * | 3/2007 | Ferguson ............. H04L 9/0637 380/42 |
| 2007/0120846 A1 | 5/2007 | Ok et al. |
| 2007/0130541 A1 | 6/2007 | Louch et al. |
| 2007/0158408 A1 | 7/2007 | Wang et al. |
| 2007/0160198 A1 | 7/2007 | Orsini et al. |
| 2007/0168614 A1 | 7/2007 | Jianjun et al. |
| 2007/0245048 A1 | 10/2007 | Mezet et al. |
| 2007/0259570 A1 | 11/2007 | Moshayedi |
| 2007/0271580 A1 | 11/2007 | Tischer et al. |
| 2007/0273675 A1 | 11/2007 | Wangler |
| 2007/0279852 A1 | 12/2007 | Daniel et al. |
| 2007/0282601 A1 | 12/2007 | Li |
| 2008/0024976 A1 | 1/2008 | Hardson et al. |

(56) References Cited

U.S. PATENT DOCUMENTS

| | | |
|---|---|---|
| 2008/0069358 A1 | 3/2008 | Yang |
| 2008/0080709 A1* | 4/2008 | Michtchenko ........ H04L 9/0618 |
| | | 380/44 |
| 2008/0181141 A1 | 7/2008 | Krantz et al. |
| 2008/0186305 A1 | 8/2008 | Carter |
| 2008/0222238 A1 | 9/2008 | Ivanov et al. |
| 2008/0223890 A1 | 9/2008 | Tecchiolli et al. |
| 2008/0235629 A1 | 9/2008 | Porter et al. |
| 2008/0241809 A1 | 10/2008 | Ashmore et al. |
| 2008/0250179 A1 | 10/2008 | Moon |
| 2008/0305738 A1 | 12/2008 | Khedouri et al. |
| 2008/0313450 A1 | 12/2008 | Rosenberg |
| 2008/0317068 A1 | 12/2008 | Sagar et al. |
| 2009/0009605 A1 | 1/2009 | Ortiz |
| 2009/0089692 A1 | 4/2009 | Morris |
| 2009/0116445 A1 | 5/2009 | Samar et al. |
| 2009/0144653 A1 | 6/2009 | Ubillos |
| 2009/0146775 A1 | 6/2009 | Bonnaud et al. |
| 2009/0239468 A1 | 9/2009 | He et al. |
| 2009/0240598 A1 | 12/2009 | Kargman |
| 2009/0300025 A1 | 12/2009 | Rothschild et al. |
| 2009/0316351 A1 | 12/2009 | Zadesky |
| 2010/0007768 A1 | 1/2010 | Yong et al. |
| 2010/0020035 A1 | 1/2010 | Ryu et al. |
| 2010/0050129 A1 | 2/2010 | Li et al. |
| 2010/0073869 A1 | 3/2010 | Mangaroo |
| 2010/0078343 A1 | 4/2010 | Hoellwarth et al. |
| 2010/0088634 A1 | 4/2010 | Tsuruta et al. |
| 2010/0093412 A1 | 4/2010 | Serra et al. |
| 2010/0122207 A1 | 5/2010 | Kim et al. |
| 2010/0153449 A1 | 6/2010 | Baba et al. |
| 2010/0161743 A1 | 6/2010 | Krishnamurthi et al. |
| 2010/0169639 A1 | 7/2010 | Jeffries et al. |
| 2010/0169836 A1 | 7/2010 | Stallings et al. |
| 2010/0225735 A1 | 9/2010 | Shaffer et al. |
| 2010/0238089 A1 | 9/2010 | Massand |
| 2010/0256624 A1 | 10/2010 | Brannon et al. |
| 2010/0268929 A1 | 10/2010 | Fumiyoshi |
| 2010/0281138 A1 | 11/2010 | Froirntchuk et al. |
| 2010/0309228 A1 | 12/2010 | Mattos et al. |
| 2010/0313154 A1 | 12/2010 | Choi et al. |
| 2010/0315225 A1 | 12/2010 | Harrison et al. |
| 2010/0315417 A1 | 12/2010 | Cho et al. |
| 2011/0051642 A1 | 3/2011 | Krishnaswamy |
| 2011/0063211 A1 | 3/2011 | Hoerl et al. |
| 2011/0090534 A1 | 4/2011 | Terao et al. |
| 2011/0107269 A1 | 5/2011 | Chiu et al. |
| 2011/0113251 A1 | 5/2011 | Lu et al. |
| 2011/0131660 A1 | 6/2011 | Claessen et al. |
| 2011/0134110 A1 | 6/2011 | Song et al. |
| 2011/0138175 A1 | 6/2011 | Clark et al. |
| 2011/0179368 A1 | 7/2011 | King et al. |
| 2011/0252098 A1 | 10/2011 | Kumar |
| 2011/0256905 A1 | 10/2011 | Ryan |
| 2011/0283208 A1 | 11/2011 | Gallo |
| 2011/0287808 A1 | 11/2011 | Huang |
| 2011/0294474 A1 | 12/2011 | Barany et al. |
| 2011/0295392 A1 | 12/2011 | Cunnington |
| 2011/0296339 A1 | 12/2011 | Kang |
| 2011/0310100 A1 | 12/2011 | Adimatyam et al. |
| 2012/0011200 A1 | 1/2012 | Zhang et al. |
| 2012/0034897 A1 | 2/2012 | Kreitzer et al. |
| 2012/0047517 A1 | 2/2012 | Townsend et al. |
| 2012/0098754 A1 | 4/2012 | Kim |
| 2012/0128172 A1 | 5/2012 | Alden |
| 2012/0151224 A1* | 6/2012 | Koifman ............... G06F 16/116 |
| | | 713/193 |
| 2012/0155510 A1 | 6/2012 | Hirsch et al. |
| 2012/0166953 A1 | 6/2012 | Affronti et al. |
| 2012/0194976 A1 | 8/2012 | Golko et al. |
| 2012/0200567 A1 | 8/2012 | Mandel et al. |
| 2012/0209630 A1 | 8/2012 | Ihm et al. |
| 2012/0242845 A1 | 9/2012 | Tan |
| 2012/0260218 A1 | 10/2012 | Bawel |
| 2012/0267432 A1 | 10/2012 | Kuttuva |
| 2012/0282858 A1 | 11/2012 | Gill et al. |
| 2012/0293509 A1 | 11/2012 | Barnsley |
| 2012/0310446 A1 | 12/2012 | Murphy |
| 2013/0028419 A1* | 1/2013 | Das .................... H04L 63/0428 |
| | | 380/259 |
| 2013/0050117 A1 | 2/2013 | Cho et al. |
| 2013/0073692 A1 | 3/2013 | Isaza et al. |
| 2013/0077529 A1 | 3/2013 | Lueckenhoff et al. |
| 2013/0080541 A1 | 3/2013 | Herbert |
| 2013/0097239 A1 | 4/2013 | Brown et al. |
| 2013/0111038 A1 | 5/2013 | Girard |
| 2013/0125000 A1 | 5/2013 | Fleischhauer et al. |
| 2013/0145171 A1* | 6/2013 | Hsien .................... H04L 9/3226 |
| | | 713/184 |
| 2013/0145384 A1 | 6/2013 | Krum et al. |
| 2013/0152113 A1 | 6/2013 | Conrad et al. |
| 2013/0159080 A1 | 6/2013 | Wu et al. |
| 2013/0159178 A1 | 6/2013 | Colon et al. |
| 2013/0163195 A1 | 6/2013 | Pelletier |
| 2013/0173598 A1 | 7/2013 | Nguyen |
| 2013/0173798 A1 | 7/2013 | Micucci et al. |
| 2013/0201176 A1 | 8/2013 | Lee et al. |
| 2013/0205277 A1 | 8/2013 | Seven et al. |
| 2013/0212112 A1 | 8/2013 | Blom et al. |
| 2013/0217448 A1 | 8/2013 | Kim |
| 2013/0219479 A1 | 8/2013 | Desoto et al. |
| 2013/0227420 A1 | 8/2013 | Pasquero et al. |
| 2013/0235037 A1 | 9/2013 | Baldwin et al. |
| 2013/0238711 A1 | 9/2013 | Lashkari et al. |
| 2013/0256403 A1 | 10/2013 | Mackinnon Keith |
| 2013/0260819 A1 | 10/2013 | Suzuki et al. |
| 2013/0266065 A1 | 10/2013 | Paczkowski |
| 2013/0266129 A1 | 10/2013 | Pattan et al. |
| 2013/0268802 A1 | 10/2013 | Ito et al. |
| 2013/0268955 A1 | 10/2013 | Conrad et al. |
| 2013/0272196 A1 | 10/2013 | Li et al. |
| 2013/0273983 A1 | 10/2013 | Hsu |
| 2013/0290440 A1 | 10/2013 | Pratt et al. |
| 2013/0300740 A1 | 11/2013 | Snyder |
| 2013/0303160 A1 | 11/2013 | Fong et al. |
| 2013/0317835 A1 | 11/2013 | Matthew |
| 2013/0346911 A1 | 12/2013 | Sripada |
| 2014/0012913 A1 | 1/2014 | Varoglu et al. |
| 2014/0026204 A1 | 1/2014 | Buntinx et al. |
| 2014/0034531 A1 | 2/2014 | Wang |
| 2014/0039804 A1 | 2/2014 | Park et al. |
| 2014/0040777 A1 | 2/2014 | Jones et al. |
| 2014/0052522 A1 | 2/2014 | Irani et al. |
| 2014/0052618 A1 | 2/2014 | Drozd et al. |
| 2014/0055822 A1 | 2/2014 | Hannaway et al. |
| 2014/0078136 A1 | 3/2014 | Sohn et al. |
| 2014/0082547 A1 | 3/2014 | Ding |
| 2014/0106677 A1 | 4/2014 | Altman |
| 2014/0121858 A1 | 5/2014 | Chen |
| 2014/0123033 A1 | 5/2014 | Ross |
| 2014/0132594 A1 | 5/2014 | Gharpure et al. |
| 2014/0132736 A1 | 5/2014 | Chang et al. |
| 2014/0136429 A1 | 5/2014 | Psihos |
| 2014/0141713 A1 | 5/2014 | Shirinfar et al. |
| 2014/0156725 A1 | 6/2014 | Mandyam |
| 2014/0189532 A1 | 7/2014 | Sivaraman et al. |
| 2014/0203950 A1* | 7/2014 | Zdeblick ................. G16H 40/67 |
| | | 340/870.07 |
| 2014/0207657 A1 | 7/2014 | Gacs et al. |
| 2014/0218356 A1 | 8/2014 | Distler |
| 2014/0232817 A1 | 8/2014 | Jones et al. |
| 2014/0258938 A1 | 9/2014 | Christmas et al. |
| 2014/0337640 A1 | 11/2014 | Sharma et al. |
| 2014/0351181 A1 | 11/2014 | Canoy et al. |
| 2014/0355761 A1 | 12/2014 | Kawamura et al. |
| 2015/0009531 A1 | 1/2015 | Kawaguchi |
| 2015/0012617 A1 | 1/2015 | Park et al. |
| 2015/0015368 A1 | 1/2015 | Roth |
| 2015/0019628 A1 | 1/2015 | Li |
| 2015/0082399 A1* | 3/2015 | Wu ....................... H04L 9/0897 |
| | | 726/6 |
| 2015/0095777 A1 | 4/2015 | Lim et al. |
| 2015/0101018 A1 | 4/2015 | Forte |
| 2015/0106837 A1 | 4/2015 | Li et al. |

(56) References Cited

U.S. PATENT DOCUMENTS

| | | |
|---|---|---|
| 2015/0133000 A1 | 5/2015 | Kim |
| 2015/0133204 A1 | 5/2015 | Ivanovski |
| 2015/0145889 A1 | 5/2015 | Hanai |
| 2015/0177362 A1 | 6/2015 | Gutierrez |
| 2015/0194833 A1 | 7/2015 | Fathollahi et al. |
| 2015/0271271 A1 | 9/2015 | Bullota et al. |
| 2015/0271299 A1 | 9/2015 | Bullota et al. |
| 2015/0271307 A1 | 9/2015 | Berg et al. |
| 2015/0279470 A1 | 10/2015 | Cerrelli et al. |
| 2015/0281439 A1 | 10/2015 | Dudai |
| 2015/0339867 A1 | 11/2015 | Amon |
| 2015/0367230 A1 | 12/2015 | Bradford et al. |
| 2015/0382169 A1 | 12/2015 | Burba |
| 2016/0014574 A1 | 1/2016 | Christmas et al. |
| 2016/0037055 A1 | 2/2016 | Waddington |
| 2016/0100279 A1 | 4/2016 | Christmas et al. |
| 2016/0134941 A1 | 5/2016 | Selvaraj |
| 2016/0162244 A1 | 6/2016 | Christmas et al. |
| 2016/0188468 A1 | 6/2016 | Rao |
| 2016/0195899 A1 | 7/2016 | Plante |
| 2016/0198322 A1 | 7/2016 | Pitis |
| 2016/0205804 A1 | 7/2016 | Hartman |
| 2016/0226730 A1 | 8/2016 | Schumacher |
| 2016/0260319 A1 | 9/2016 | Jeffery et al. |
| 2016/0269468 A1 | 9/2016 | Malpass |
| 2017/0034167 A1* | 2/2017 | Figueira ............. H04L 63/0428 |
| 2017/0134803 A1 | 5/2017 | Shaw et al. |
| 2017/0160992 A1 | 6/2017 | Christmas et al. |
| 2017/0371378 A1 | 12/2017 | Christmas et al. |
| 2018/0009416 A1 | 1/2018 | Maiwand |
| 2018/0032531 A1 | 2/2018 | Shiomi |
| 2018/0146378 A1 | 5/2018 | Christmas et al. |
| 2018/0375641 A1* | 12/2018 | Murguia Cosentino ..................... H04L 9/0618 |
| 2019/0007477 A1 | 1/2019 | Malpass |
| 2019/0012473 A1 | 1/2019 | Christmas et al. |
| 2019/0020576 A1 | 1/2019 | Christmas et al. |
| 2019/0037381 A1 | 1/2019 | Christmas et al. |
| 2019/0123501 A1 | 4/2019 | Christmas |

FOREIGN PATENT DOCUMENTS

| | | | |
|---|---|---|---|
| CN | 1881164 | 12/2006 | |
| CN | 101388815 | 3/2009 | |
| CN | 101401341 | 4/2009 | |
| CN | 102376133 | 3/2012 | |
| CN | 202230439 U | 5/2012 | |
| CN | 202230493 U | 5/2012 | |
| CN | 102591571 A | 7/2012 | |
| CN | 103077462 | 5/2013 | |
| CN | 103095852 | 5/2013 | |
| CN | 103546181 A | 1/2014 | |
| CN | 104238730 | 12/2014 | |
| CN | 205427859 U | 8/2016 | |
| CN | 106797337 | 5/2018 | |
| CN | 105706033 | 5/2019 | |
| DE | 102008023577 A1 * | 11/2009 | ........... H04L 9/0625 |
| EP | 0800144 A2 | 10/1997 | |
| EP | 1168769 A2 | 2/2002 | |
| EP | 1761048 A2 | 3/2007 | |
| EP | 1806649 A1 | 7/2007 | |
| EP | 2642728 A | 3/2013 | |
| EP | 3022638 | 4/2018 | |
| HK | 1242492 | 6/2018 | |
| JP | H07-108883 A | 4/1995 | |
| JP | 09-091155 | 4/1997 | |
| JP | 2001344571 A | 12/2001 | |
| JP | 2003184379 A | 7/2003 | |
| JP | 2005-054368 A | 3/2005 | |
| JP | 2006-317802 A | 11/2006 | |
| JP | 2007-049606 | 2/2007 | |
| JP | 2010-535351 | 11/2010 | |
| JP | 2011-134159 | 7/2011 | |
| JP | 2011-147136 | 7/2011 | |
| JP | 2011-248489 | 12/2011 | |
| JP | 2012-050075 A | 3/2012 | |
| JP | 2013-185344 A | 9/2013 | |
| JP | 2013-204254 A | 10/2013 | |
| JP | 2013-214801 | 10/2013 | |
| JP | 2014071581 A | 4/2014 | |
| JP | 2016-111446 A | 6/2016 | |
| JP | 2016-517317 A | 6/2016 | |
| JP | 6310477 | 4/2018 | |
| JP | 2018-514845 | 6/2018 | |
| JP | 6479026 | 2/2019 | |
| KR | 10-2004-018122 | 12/2004 | |
| KR | 10-2005-098078 | 10/2005 | |
| KR | 10-2009005972 | 6/2009 | |
| KR | 10-20100056594 | 5/2010 | |
| KR | 10-20120092487 A | 8/2012 | |
| KR | 10-2012-0059488 | 5/2013 | |
| KR | 10-2017-0047866 | 5/2017 | |
| RU | 2421800 | 6/2011 | |
| TW | 201214150 | 4/2012 | |
| TW | 201320681 | 5/2013 | |
| TW | 201349811 | 12/2013 | |
| TW | 629910 | 7/2018 | |
| WO | 2000033545 | 6/2000 | |
| WO | 2005050393 | 6/2005 | |
| WO | 2006107324 | 10/2006 | |
| WO | 2006125027 | 11/2006 | |
| WO | 2007076494 A2 | 7/2007 | |
| WO | 2007103908 A2 | 9/2007 | |
| WO | 2008090902 | 7/2008 | |
| WO | 2009016612 | 2/2009 | |
| WO | 2010018551 | 8/2010 | |
| WO | 2012087847 A2 | 6/2012 | |
| WO | 2014012486 | 1/2014 | |
| WO | 2014016622 | 1/2014 | |
| WO | 2014085502 | 6/2014 | |
| WO | 2014138187 | 9/2014 | |
| WO | 2014141235 | 9/2014 | |
| WO | 2014151925 A1 | 9/2014 | |
| WO | 2015009944 | 1/2015 | |
| WO | 2015022615 | 2/2015 | |
| WO | 2015048684 | 4/2015 | |
| WO | 2015112506 | 7/2015 | |
| WO | 2016007780 | 1/2016 | |
| WO | 2016057091 | 4/2016 | |
| WO | 2016145126 | 9/2016 | |
| WO | 2017090014 A1 | 6/2017 | |
| WO | 2017096245 | 6/2017 | |
| WO | 2018098313 | 5/2018 | |
| WO | 2018144833 | 8/2018 | |
| WO | 2018173798 A1 | 9/2018 | |
| WO | 2018232186 | 12/2018 | |
| WO | 2019079628 | 4/2019 | |

OTHER PUBLICATIONS

Shinge SR, Patil R. An encryption algorithm based on ASCII value of data. International Journal of Computer Science and Information Technologies. Nov. 2014; 5(6)7232-4. (Year: 2014).*

Sokouti M, Sokouti B, Pashazadeh S. An approach in improving transposition cipher system. Indian Journal of Science and Technology. Aug. 2009;2(8):9-15. (Year: 2009).*

USPTO; Non-Final Office Action dated Feb. 6, 2019 in U.S. Appl. No. 15/644,556.

USPTO; Final Office Action dated Feb. 7, 2019 in U.S. Appl. No. 14/795,210.

USPTO; Non-Final Office Action dated Mar. 7, 2019 in U.S. Appl. No. 15/367,961.

USPTO; Advisory Action dated Mar. 12, 2019 in U.S. Appl. No. 14/197,517.

CN; 1st Office Action dated Nov. 26, 2018 in Application Serial No. 201480065117.6.

CN; Notice of Intent to Grant dated Feb. 11, 2019 in Application No. CN 201380070415.

EP; Notice of Intent to Grant dated Jan. 4, 2019 in Application No. EP14760041.5.

(56) References Cited

OTHER PUBLICATIONS

CN; Notice of Intent to Grant dated Jan. 30, 2019 in Application No. CN 201480023946.8.
EP; Examination Report dated Feb. 5, 2019 in Application No. EP 13859205.0.
JP; Notice of Allowance dated Dec. 30, 2018 in Application No. JP 2016-549317.
TW; Search Report dated Dec. 10, 2018 in Application No. TW 107119353.
TW; First Office Action dated Dec. 6, 2018 in Application No. TW 107119353.
EP; Examination Report dated Jan. 3, 2019 in Application No. EP 15848371.9.
PCT; International Search Report and Written Opinion dated Oct. 12, 2018 in International Application PCT/US2018/037643.
Rico Fabio et al., "A Testbed for Developing, Simulating and Experimenting Multipath Aggregation Algorithms," Proceedings of the 2014 IEEE Emerging Technology and Factory Automation (ETFA), IEEE, pp. 1-4, (Sep. 2014).
USPTO; Notice of Allowance dated May 21, 2019 in U.S. Appl. No. 15/644,556.
USPTO; Non-Final Office Action dated May 30, 2019 in U.S. Appl. No. 16/114,531.
USPTO; Non-Final Office Action dated Jun. 14, 2019 in U.S. Appl. No. 14/197,517.
USPTO; Restriction Requirement dated Jun. 20, 2019 in U.S. Appl. No. 16/152,342.
AU; 2nd Examination Report Mar. 20, 2019 in Application No. AU 2014225864.
MX; 3rd Examination Report dated Mar. 21, 2019 in Application No. MX/a/2016/003798.
CA; Office Action dated Nov. 23, 2018 in Application No. CA 2892664.
CA; 2nd Office Action dated Feb. 14, 2019 in Application No. CA 2892664.
AU; Examination Report dated Feb. 8, 2019 in Application No. AU 2015328723.
RU; Examination Report dated Jan. 31, 2019 in Application No. RU 2017113541.
EP; Examination Report dated Apr. 18, 2019 in Application No. EP 15819468.8.
JP; Examination Report dated May 8, 2019 in Application No. 2017-518492.
MX; Examination Report dated Jun. 19, 2019 in Application No. MX/a/2017/004463.
MX; Examination Report dated May 27, 2019 in Application No. MX/a/2016/000616.
Sweden; Office Action dated Jul. 17, 2019 in Application No. 1551071-2.
CN; Second Office Action dated Apr. 29, 2019 in Application No. 201480065117.6.
PCT; International Search Report dated Feb. 12, 2019 in International Application PCT/US2019/056562 (Received Apr. 25, 2019).
PCT; Written Opinion dated Feb. 12, 2019 in International Application No. PCT/US2019/056562 (Received Apr. 25, 2019).
USPTO; Non-Final Office Action dated Sep. 30, 2019 in U.S. Appl. No. 16/152,342.
USPTO; Notice of Allowance dated Aug. 28, 2019 in the U.S. Appl. No. 15/821,212.
USPTO; Restriction Requirement dated Jun. 11, 2019 in the U.S. Appl. No. 16/164,468.
CN; Third Office Action dated Aug. 8, 2019 in Application No. 201480065117.6.
PCT; International Preliminary Report on Patentability dated Jan. 19, 2017 in the International Application No. PCT/US2015/039797.
PCT; International Preliminary Report on Patentability dated Aug. 15, 2019 in the International Application No. PCT/US2018/016610.
PCT; International Search Report and Written Opinion dated Mar. 22, 2019 in the International Application No. PCT/US2018/063468.
PCT; International Search Report and Written Opinion dated Aug. 9, 2019 in the International Application No. PCT/US2019/027993.
USPTO; Office Action dated Oct. 8, 2015 in U.S. Appl. No. 14/092,165.
USPTO; Office Action dated Sep. 18, 2015 in U.S. Appl. No. 14/164,919.
USPTO; Office Action dated Apr. 5, 2016 in U.S. Appl. No. 14/500,363.
USPTO; Final Office Action dated Jun. 3, 2016 in U.S. Appl. No. 14/092,165.
USPTO; Final Office Action dated Apr. 26, 2016 in U.S. Appl. No. 14/164,919.
USPTO; Office Action dated Jun. 22, 2016 in U.S. Appl. No. 14/745,100.
USPTO; Office action dated Apr. 22, 2016 in U.S. Appl. No. 14/709,231.
USPTO; Notice of Allowance dated Aug. 16, 2016 in U.S. Appl. No. 14/092,165.
USPTO; Office Action dated Oct. 6, 2016 in U.S. Appl. No. 14/197,517.
USPTO; Final Office Action dated Oct. 26, 2016 in U.S. Appl. No. 14/500,363.
USPTO; Final Office Action dated Oct. 11, 2016 in U.S. Appl. No. 14/709,231.
USPTO; Notice of Allowance dated Oct. 14, 2016 in U.S. Appl. No. 14/164,919.
USPTO; Final Office Action dated Dec. 20, 2016 in U.S. Appl. No. 14/745,100.
USPTO; Office Action dated Nov. 25, 2016 in U.S. Appl. No. 14/795,210.
USPTO; Office Action dated Apr. 7, 2017 in U.S. Appl. No. 14/500,363.
USPTO; Office Action dated Apr. 14, 2017 in U.S. Appl. No. 14/905,639.
USPTO; Office Action dated Apr. 6, 2017 in U.S. Appl. No. 14/709,231.
USPTO; Office Action dated May 4, 2017 in U.S. Appl. No. 14/745,100.
USPTO; Final Office Action dated Jun. 30, 2017 in U.S. Appl. No. 14/197,517.
USPTO; Final Office Action dated Aug. 17, 2017 in U.S. Appl. No. 14/795,210.
USPTO; Notice of Allowance dated Oct. 11, 2017 in U.S. Appl. No. 14/905,639.
USPTO; Final Office Action dated Oct. 3, 2017 in U.S. Appl. No. 14/500,363.
USPTO; Final Office action dated Sep. 29, 2017 in U.S. Appl. No. 14/709,231.
USPTO; Office Action dated Oct. 25, 2017 in U.S. Appl. No. 15/435,884.
USPTO; Final Office Action dated Oct. 13, 2017 in U.S. Appl. No. 14/745,100.
USPTO; Notice of Allowance dated Nov. 29, 2017 in U.S. Appl. No. 14/905,639.
USPTO; Non-Final Office Action dated Dec. 12, 2017 in U.S. Appl. No. 15/367,961.
USPTO; Non-Final Office Action dated Jan. 8, 2018 in U.S. Appl. No. 15/065,713.
USPTO; Notice of Allowance dated Feb. 26, 2018 in U.S. Appl. No. 14/745,100.
USPTO; Non-Final Office Action dated Mar. 8, 2018 in U.S. Appl. No. 14/197,517.
USPTO; Notice of Allowance dated May 7, 2018 in U.S. Appl. No. 15/065,713.
USPTO; Notice of Allowance dated May 17, 2018 in U.S. Appl. No. 14/709,231.
USPTO; Non-Final Office Action dated May 18, 2018 in U.S. Appl. No. 15/644,556.
USPTO; Notice of Allowance dated May 22, 2018 in U.S. Appl. No. 15/435,884.
USPTO; Notice of Allowance dated May 29, 2018 in U.S. Appl. No. 15/065,713.

(56) References Cited

OTHER PUBLICATIONS

USPTO; Notice of Allowance dated Jun. 20, 2018 in U.S. Appl. No. 15/435,884.
USPTO; Non-Final Office Action dated Jun. 28, 2018 in U.S. Appl. No. 14/795,210.
USPTO; Notice of Allowance dated Jun. 29, 2018 in U.S. Appl. No. 15/065,713.
USPTO; Notice of Allowance dated Jul. 5, 2018 in U.S. Appl. No. 14/745,100.
USPTO; Notice of Allowance dated Jul. 10, 2018 in U.S. Appl. No. 14/709,231.
USPTO; Final Office Action dated Aug. 10, 2018 in U.S. Appl. No. 15/367,961.
USPTO; Notice of Allowance dated Sep. 28, 2018 in U.S. Appl. No. 15/644,556.
USPTO; Final Office Action dated Oct. 18, 2018 in U.S. Appl. No. 14/197,517.
EP; Extended Search Report dated Sep. 17, 2015 in Application Serial No. 15740208.2.
Sweden; Office Action dated Nov. 18, 2015 in Application Serial No. 1551071-2.
EP; Supplemental Search Report dated Jun. 14, 2016 in Application Serial No. 13859205.0.
EP; Supplemental Search Report dated Oct. 20, 2016 in Application Serial No. 14760041.5.
EP; Extended Search Report dated Jan. 24, 2017 in Application Serial No. 14760041.5.
EP; Supplemental Search Report dated Mar. 2, 2017 in Application Serial No. 14826056.5.
EP; Extended Search Report dated Mar. 21, 2017 in Application Serial No. 14846886.1.
MX; Examination Report dated Feb. 24, 2017 in Application Serial No. 2015/006550.
MX; Examination Report dated Apr. 21, 2017 in Application Serial No. 2015/011314.
JP; Examination Report dated Jul. 28, 2017 in Application Serial No. 2015-545200.
CN; Examination Report dated Jul. 28, 2017 in Application Serial No. 20138007041.5X [Assoc did not report OA Until Sep. 27, 2017].
CN; 2nd Examination Report dated Apr. 18, 2018 in Application Serial No. 201380070415.X.
CN; Examination Report dated May 9, 2018 in Application Serial No. 201480023946.8.
CN; 1st Office Action dated Nov. 20, 2018 in Application Serial No. 201580016416.5.
MX; 2nd Examination Report dated Oct. 24, 2017 in Application Serial No. 2015/011314.
MX; 3rd Examination Report dated Jul. 2, 2018 in Application No. 2015/011314 (Received on Sep. 7, 2018).
EP; Supplemental Search Report dated Sep. 15, 2017 in Application Serial No. 15740208.2.
MX; Office Action dated Jan. 23, 2018 in Application Serial No. MX/a/2016/003798.
TW; Office Action dated Jan. 24, 2018 in Application Serial No. 104102514.
TW; Notice of Allowance dated May 15, 2018 in Application Serial No. 104102514.
EP; Extended Search Report dated Apr. 9, 2018 in Application Serial No. 15848371.9.
EP; Supplementary Search Report dated Apr. 30, 2018 in Application Serial No. 15848371.9.
EP; Extended Search Report dated Apr. 24, 2018 in Application Serial No. 15819468.8.
JP; Office Action dated Aug. 2, 2017 in Application Serial No. 2015-545200.
JP; Notice of Allowance dated Mar. 17, 2018 in Application Serial No. 2015-545200.
JP; Office Action dated Feb. 2, 2018 in Application Serial No. 2016-549317.
AU; 1st Office Action dated Apr. 13, 2018 in Application Serial No. 2013352236.
EP; Extended Search Report and Supplementary Search Report dated Oct. 19, 2018 in Application Serial No. 16762464.2.
AU; 1st Office Action dated Oct. 24, 2018 in Application Serial No. 2015287705.
MX; 2nd Examination Report dated Oct. 4, 2018 (Received from Mexico Counsel on Nov. 6, 2018) in Application Serial No. MX/a/2016/003798.
CN; 3rd Examination Report dated Oct. 31, 2018 in Application Serial No. CN 2013 80070415.
EPO; Examination Report dated Nov. 8, 2018 in Application No. EP 15740208.2.
AU; Examination Report dated Dec. 19, 2018 in Application Serial No. AU 2014225864.
PCT; International Search Report dated Jul. 4, 2014 in Application No. US2014/020624.
PCT; Written Opinion dated Jul. 4, 2014 in Application No. US2014/020624.
PCT; International Preliminary Report on Patentability dated Sep. 8, 2015 in Application No. US2014/020624.
PCT; International Search Report dated Nov. 13, 2014 inUS2014/047054.
PCT; Written Opinion dated Nov. 13, 2014 in US2014/047054.
PCT; International Preliminary Report on Patentability dated Jan. 19, 2016 in US2014/047054.
PCT; International Search Report dated Jan. 6, 2015 inUS2014/058126.
PCT; Written Opinion dated Jan. 6, 2015 inUS2014/058126.
PCT; International Search Report dated Mar. 5, 2014 inU.S. Pat. No. 2013042089.
PCT; Written Opinion dated Mar. 5, 2015 in US2013/072089.
PCT; International Preliminary Report on Patentability dated Jun. 2, 2015 in U.S. Pat. No. 2013072089.
PCT; International Search Report dated Apr. 24, 2015 in US2015/012063.
PCT; Written Opinion dated Apr. 24, 2015 in US2015/012063.
PCT; International Search Report and Written Opinion dated Oct. 6, 2015 in US2015/036801.
PCT; International Search Report and Written Opinion dated Nov. 2, 2015 in US2015/039797.
PCT; International Preliminary Report on Patentability dated Apr. 14, 2016 in US2014/058126.
PCT; International Search Report and Written Opinion dated Jul. 11, 2016 in US2016/021627.
PCT; International Search Report and Written Opinion dated Mar. 20, 2017 in US/2016/064744.
PCT; International Search Report and Written Opinion dated Feb. 20, 2018 in US/2017/063061 received May 31, 2018.
PCT; International Search Report and Written Opinion dated Aug. 9, 2018 in International Application PCT/US2018/016610.
Kim, Young-Gon, and Moon-Seog Jun. A design of user authentication system using QR code identifying method. Computer Sciences and Convergence Information Technology (ICCIT), 6th International Conference on IEEE. Nov 29-Dec. 1, 2011.
Application Programming Interface by David Orenstein, published Jan. 10, 2000 on Computerworld.com.
Gerd Kortuem et al., "Architectural Issues in Supporting Ad-hoc Collaboration with Wearable Computers," In: Proceedings of the Workshop on Software Engineering for Wearable and Pervasive Computing at the 22nd International Conference on Software Engineering, 2000.
3rd party observation dated Dec. 22, 2015 against Patent Application No. 1551071-2 in Sweden.
Revault Product Data Sheet dated Mar. 19, 2015.
Dusk Jockeys; Dust Jockeys Android Apps dated Mar. 7, 2012, pp. 1-5.
Sue White: Wi-Fi and Bluetooth Coexistence, Electronic Component News, Mar. 2, 2012, pp. 1-7, XP05504386, Retrieved from Internet: URL: https://www.ecnmag.com/article/2012/03/wi-fi-andbluetooth-coexistence [retrieved on Sep. 6, 2017].

(56) References Cited

OTHER PUBLICATIONS

"Class Persistent Manager," https://web.archive.org/web/20131110042918/https://tomcat.apache.org/tomcat-4.1-doc/catalina/docs/api/org/apache/catalina/session, 3 Pages, (Oct. 2018).
EP; European Extended Search Report in the EP Application No. 18748348.2 dated Nov. 4, 2020.
USPTO; Notice of Allowance dated Oct. 31, 2019 in the U.S. Appl. No. 16/164,468.
USPTO; Non-Final Office Action dated Dec. 20, 2019 in the U.S. Appl. No. 16/164,468.
USPTO; Non-Final Office Action dated Jan. 10, 2020 in the U.S. Appl. No. 16/387,464.
USPTO; Notice of Allowance dated Dec. 16, 2020 in the U.S. Appl. No. 16/554,373.
USPTO; Notice of Allowance dated Dec. 16, 2020 in the U.S. Application No. 16/387,464.
EP; European Notice of Publication in the EP Application No. 18882373.6 dated Sep. 9, 2020.
EP; Extended Search Report dated Nov. 4, 2020 in EP 18748348.2.
PCT; International Preliminary Patentability Report dated Oct. 29, 2020 in PCT/US2019027993.
PCT; International Preliminary Report on Patentability dated Dec. 26, 2019 in PCT/US2018/037643.
USPTO; Notice of Allowance dated Apr. 29, 2020 in the U.S. Appl. No. 16/164,468.
USPTO; Final Office Action dated Jul. 24, 2020 in the U.S. Appl. No. 16/387,464.
USPTO; Non-Final Office Action dated Sep. 29, 2020 in the U.S. Appl. No. 16/483,004.
EP; European Search Report dated Jul. 31, 2020 in the EP Application No. 18748348.2.
X Autohaux, "Keyless Entry System", Jun. 2, 2016, XP055717379 Retrieved from the Internet URL: https://images-na.ssl-images-amazon.com/images/I/91ncMVRWOSL.pdf [retrieved on 2020-.
USPTO; Supplemental Notice of Allowance dated Feb. 18, 2021 in the U.S. Appl. No. 16/554,373.
USPTO; Final Office Action dated Mar. 29, 2021 in the U.S. Appl. No. 16/483,004.
EP; Extended European Search Report dated May 19, 2021 in the EP Application No. 18816954.4.
PKCS #5 V2.0 Password-Based Cryptography Standard, Pkcs NRB.1 V2.0: Rsa Cryptography Standard, XX, XX, #5 Mar. 25, 1999.
Modern Programmable Controller Network Communication Technology, Wang Renxiang, Wang Xiaoman, pp. 176-180, China Electric Power Press, May 2006.
CN; Office Action dated May 24, 2021 in Application Serial No. 201980040511.7.
EP; Search Report dated Jul. 9, 2021 in Application Serial No. 18882373.6.
CN; Office Action dated Aug. 16, 2021 in Application Serial No. 201880020064.4.
JP; Office Action dated Nov. 29, 2021 in Application Serial No. 2019-542452.
EP; Search Report dated Dec. 2, 2021 in Application Serial No. 19788549.4.
IN; Office Action dated Mar. 9, 2022 in Application Serial No. 202017000785.
AU; Office Action dated Apr. 28, 2022 in Application Serial No. 2018285545.
CN; Office Action dated May 6, 2022 in Application Serial No. 201880020064.4.
JP; Office Action dated May 27, 2022 in Application Serial No. 2019-542452.
KR; Office Action dated Jul. 15, 2022 in Application Serial No. 10-2020-7000866.
JP; Office Action dated Jul. 27, 2022 in Application Serial No. 2019-569833.
KR; Office Action dated Aug. 12, 2022 in Application Serial No. 10-2019-7025759.
CN; Office Action dated Aug. 15, 2022 in Application Serial No. 201880020064.4.
IN; Office Action dated Aug. 23, 2022 in Application Serial No. 202017048781.
KR; Office Action dated Oct. 25, 2022 in Application Serial No. 10-2022-7032033.
KR; Office Action dated Oct. 25, 2022 in Application Serial No. 10-2022-7032036.
EP; Office Action dated Nov. 7, 2022 in Application Serial No. 18748348.2.
TW; Office Action dated Dec. 21, 2022 in Application Serial No. 108113448.
JP; Office Action dated Jan. 11, 2023 in Application Serial No. 2020-529716.
EP; Office Action dated Feb. 27, 2023 in Application Serial No. 18882373.6.
USPTO; Non-Final Office Action dated Jul. 22, 2020 in U.S. Appl. No. 16/554,373.
USPTO; Non-Final Office Action dated Oct. 6, 2021 in U.S. Appl. No. 16/483,004.
USPTO; Notice of Allowance dated Mar. 9, 2022 in U.S. Appl. No. 17/228,541.
USPTO; Final Office Action dated Apr. 25, 2022 in U.S. Appl. No. 16/483,004.
USPTO; Non-Final Office Action dated Sep. 9, 2022 in U.S. Appl. No. 16/483,004.
KIPO; Notice of Allowance dated Sep. 22, 2022 in Application No. 2022-071947008.
JPO; Notice of Allowance dated Oct. 21, 2022 in Application No. JP 2016-542452.
JPO; Notice of Reason for Rejection dated Jan. 27, 2023 in Application No. JP 2020-557949.
JPO; Notice of Reason for Rejection dated Feb. 3, 2023 in Application No. JP 2019-569833.
USPTO; Notice of Allowance dated Mar. 7, 2023 in U.S. Appl. No. 16/483,004.
JPO; Notice of Allowance dated Apr. 17, 2023 for Application No. 2023-034742281.
KIPO; Notice of Preliminary Rejection dated Apr. 29, 2023 in Application No. 2020-7019034.
KIPO; Notice of Preliminary Rejection dated May 17, 2023 in Application No. 2022-7045455.
KIPO; Notice of Allowance dated May 24, 2023 in Application No. 2023-047665504.
KIPO; Notice of Allowance dated May 24, 2023 in Application No. 2023-047665649.
IMPI; First Office Action dated Apr. 27, 2023 in Application No. MX/a/2019/015176.
AGIP; First Examination Report dated Jul. 10, 2023 in Application No. 2018374384.
PCT; International Search Report and Written Opinion dated May 15, 2018 in Application No. PCT/US2018/016610.
PCT; International Search Report and Written Opinion dated Oct. 12, 2018 in Application No. PCT/US2018/037643.
CNIPA; Notice of the First Office Action dated Mar. 28, 2023 in Application No. 201880052992.9.

\* cited by examiner

```
    mBroadcastingSocket = new Socket(AddressFamily.InterNetwork,
SocketType.Dgram, ProtocolType.Udp);
    mBroadcastingSocketEventArgs = new SocketAsyncEventArgs();
    mBroadcastingSocket.Ttl = 255;

var broadcastaddress = GetBroadcastAddress();
    mBroadcastingSocketEventArgs.RemoteEndPoint = new
IPEndPoint(broadcastaddress, UDPPort);
```                                                                  } 410

```
    // Send the IP address we are listening on
    string packetData = JsonConvert.SerializeObject(localClient);
    byte[] payload = Encoding.UTF8.GetBytes(packetData);
    mBroadcastingSocketEventArgs.SetBuffer(payload, 0, payload.Length);

// Make an asynchronous Send request over the socket
    mBroadcastingSocket.SendToAsync(mBroadcastingSocketEventArgs);
```                                                                  } 420

```
    mDiscoverySocket = new DatagramSocket();
    // This is the TTL but on datagram socket the default of 128 is more than
enough
    mDiscoverySocket.Control.OutboundUnicastHopLimit = 255;
    mDiscoverySocket.MessageReceived += DiscoverySocketNewMessage;

Await mDiscoverySocket.BindServiceNameAsync(UDPPort.ToString()); // Port
    mDiscoverySocket.JoinMulticastGroup(new HostName(MULTICAST_ADDRESS));
```                                                                  } 430

```
    var writer = new DataWriter(await
socket.GetOutputStreamAsync(eventArguments.RemoteAddress,
eventArguments.RemotePort));
    await writer.StoreAsync();

var reader = eventArguments.GetDataReader();
    var data = new byte[reader.UnconsumedBufferLength];
    reader.ReadBytes(data);

// Get info from it
    var userDetails =
JsonConvert.DeserializeObject<IDiscoveredClient>(Encoding.UTF8.GetString(data, 0,
data.Length));
```                                                                  } 440

/// <summary>
/// The broadcast message coming from a device that can be discovered
/// </summary>
public interface IDiscoveredClient
{
    /// <summary>
    /// The name of the device (such as Windows Phone 8, iPhone 5 etc...)
    /// </summary>
    string DeviceName { get; set; }                                            ⎫ 510

/// <summary>
    /// The IP address where this device can be reached
    /// </summary>
    string ImagePath { get; set; }                                             ⎫ 520

/// <summary>
    /// The name of the owner of the device (such as the email account or
computer username)
    /// </summary>
    string Username { get; set; }                                              ⎫ 530

/// <summary>
    /// The devices endpoint (IP or name)
    /// </summary>
    string Endpoint { get; set; }                                              ⎫ 540

/// <summary>
    /// The transport layer (such as Bluetooth, NFC, WFD, PDQ) that this
client was discovered on
    /// </summary>
    string TransportLayer { get; set; }                                        ⎫ 550
}
```

/// <summary>
/// The broadcast message coming from a device that can be discovered
/// </summary>
public interface IFileTransferRequest
{
    /// <summary>
    /// The client wishing to share the file with you
    /// </summary>
    IDiscoveredClient Client { get; set; }                              ⎫ 610

/// <summary>
    /// The filename of the file wanting to be sent
    /// </summary>
    string Filename { get; set; }                                       ⎫ 620

/// <summary>
    /// The size of the file wanting to be sent
    /// </summary>
    long Filesize { get; set; }                                         ⎫ 630

/// <summary>
    /// The client that will be receiving the file from you
    /// </summary>
    IDiscoveredClient ReceivingClient { get; set; }                     ⎫ 640

/// <summary>
    /// The unique ID for this file transfer
    /// </summary>
    Guid UniqueID { get; set; }                                         ⎫ 650

/// <summary>
    /// The transport layer associated with this request
    /// </summary>
    string TransportName { get; set; }                                  ⎫ 660
}
```

/// <summary>
/// The response from a file transfer request
/// </summary>
public interface IFileTransferResponse
{
    /// <summary>
    /// The response from the user
    /// </summary>
    bool Response { get; set; }              ⎬ 710

/// <summary>
    /// The unique ID for this file transfer
    /// </summary>
    Guid UniqueID { get; set; }              ⎬ 720
} public interface IFileReceivedConfirmation
{
    bool Response { get; set; }              ⎬ 730
    Guid UniqueID { get; set; }
}
```

FIG. 7

# SYSTEMS AND METHODS FOR IMPROVED DATA ENCRYPTION

CROSS-REFERENCE TO RELATED APPLICATIONS

This Non-Provisional patent application claims priority to U.S. Provisional Patent Application Ser. No. 62/593,603, entitled "SYSTEMS AND METHODS FOR IMPROVED DATA ENCRYPTION," and filed Dec. 1, 2017, which is incorporated herein by reference in its entirety.

FIELD

The present disclosure generally relates to data cryptography, and more particularly to systems and methods for improved data encryption in portable storage devices.

BACKGROUND

Communication between devices is typically performed over a network, such as the internet or a local area network. However, networks may not always be available for communication between devices and additionally may expose communications to security breaches on the network. Devices enabled with Bluetooth® may communicate directly. However, Bluetooth® enabled devices must be within a limited range, and communication speeds may be relatively slow. Consumers may have files stored on one device and wish to access the files from another device. It may be difficult to transfer the file without an internet connection or using data on a data plan. Additionally, transferring the information may expose the information to hackers and security breaches.

Information may be stored on portable storage devices (e.g., USB sticks) to facilitate the physical transfer of data from one device to a second device. Data retained on the storage device may be encrypted to partially prevent third parties from accessing and viewing the data. Typical encryption methods use cyphers to create data that is easy to encrypt but hard to reverse without knowing the cypher, or use one-way hashing to produce a hashed value that can be compared and confirmed to match, but the stored data can no longer be viewed. Typical encryption methods may be susceptible to attacks by hackers or other third parties

SUMMARY

Systems and methods of encrypting a data file on a portable storage device is disclosed. The system may retrieve a plurality of math functions based on a password input. The system may apply the math functions to each byte in the data file. The system may transpose a position of bytes in the data file based on the password input. The system may add filler bytes into the data file based on the password input. The system may adjust a starting byte position of the data file based on the password input.

Data may be encrypted using the enclosed processes on any device, including portable storage devices. The systems and methods may provide a mechanism for one-way cyphering of data that cannot be reversed on its own without the same password/key used to encrypt the data. For example, a user may input a password/key to encrypt a selected data file. The selected data file may be encrypted by applying various math functions to the bytes of the data file and by rearranging and adding bytes in the data file, all based on the password/key. The password/key is not stored and is not included within the encrypted data, thus increasing the security of the encrypted data and decreasing the possibility of the password/key being compromised. A user may input a password/key to decrypt the encrypted data file. The user will only learn if the decryption was successful by viewing the decrypted data. In response to inputting an incorrect password/key during the decryption process (e.g., a password/key that does not match the original input password/key), the resulting decrypted data will be different than the original data before encrypting.

BRIEF DESCRIPTION OF THE DRAWINGS

A more complete understanding may be derived by referring to the detailed description and claims when considered in connection with the Figures, wherein like reference numbers refer to similar elements throughout the Figures, and:

FIG. 4 illustrates a discovery protocol according to various embodiments;

FIG. 5 illustrates a definition for a discovery protocol according to various embodiments;

FIG. 6 illustrates a definition for a file transfer request according to various embodiments;

FIG. 7 illustrates a definition for a response to a file transfer request according to various embodiments;

DETAILED DESCRIPTION

Figure 1:
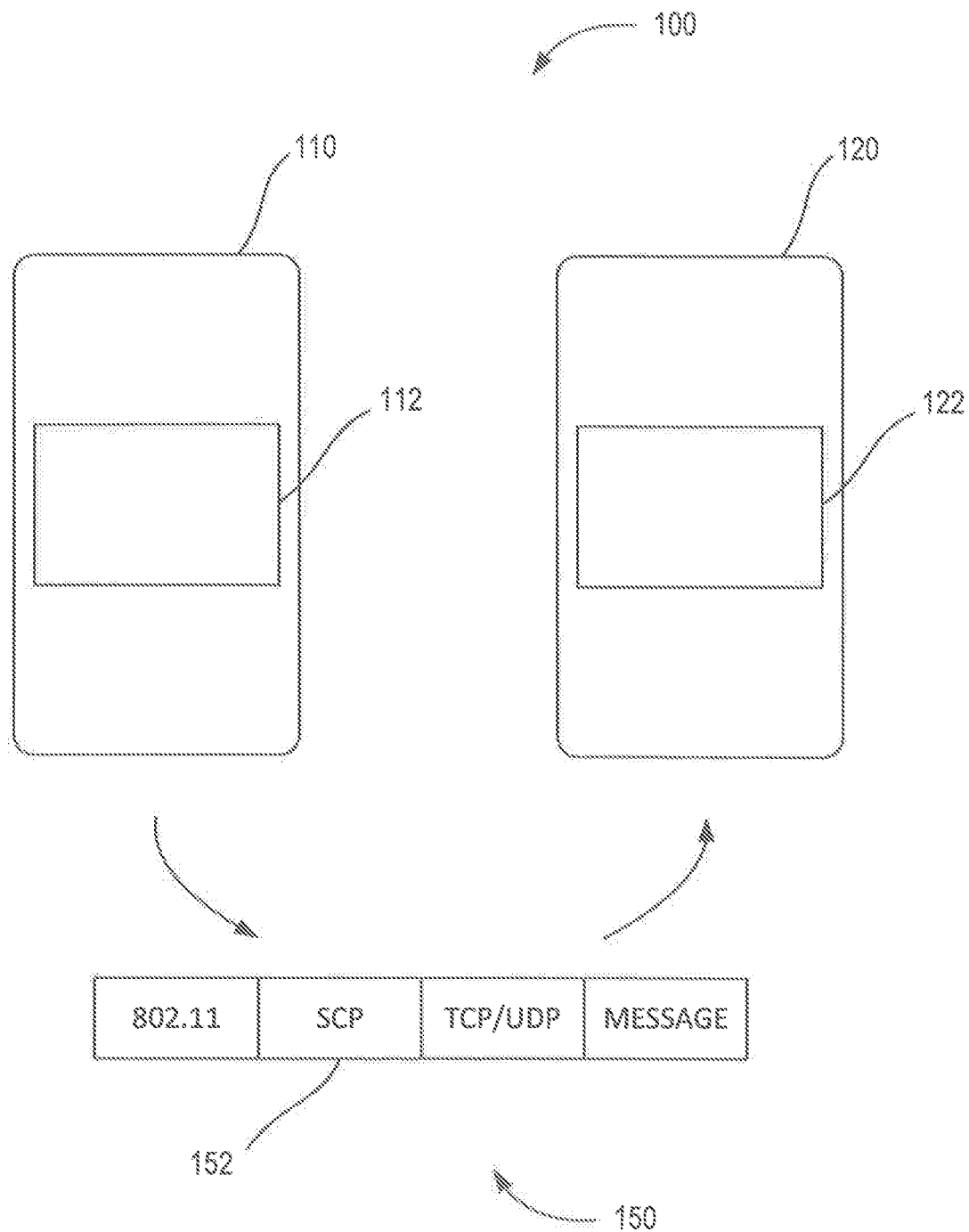
FIG. 1 illustrates a schematic diagram of a system for transmitting messages according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure relates to systems, methods, and computer program products. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. After reading the description, it will be apparent to one skilled in the relevant art(s) how to implement the disclosure in alternative embodiments.

Systems and methods are disclosed herein for the improved encryption of data. Data may be encrypted using the enclosed processes on any device including portable storage devices. The systems and methods may provide a mechanism for one-way cyphering of data that cannot be reversed on its own without the same password/key used to encrypt the data. A user may input a password/key to encrypt a selected data file. The selected data file may be encrypted by applying various math functions (based on the password/key) to the bytes of the data file and by rearranging and adding bytes in the data file, as discussed further herein. The password/key is not stored and is not included within the encrypted data, thus increasing the security of the encrypted data and decreasing the possibility of the password/key being compromised. The present disclosure may also decrease the susceptibility of encrypted data to brute force attacks by not having a check or confirmation that a decryption was successful or not successful. In that respect, a user may only learn if the decryption was successful by viewing the decrypted data. In response to inputting an incorrect password/key during the decryption process, the resulting decrypted data will be different than the original data before encrypting.

The systems and methods disclosed herein may enable communication between devices without connection to the Internet or other networks using an SCS. A standardized communication system ("SCS") may be operable on the computing devices of the present disclosure. The SCS may comprise any combination of hardware and/or software. The SCS may utilize existing physical components of the device, such as 802.11 or 802.2(2) wireless chips and Bluetooth® systems in order to communicate with other devices. The SCS may be suitable for any communication protocol, such as IP, TCP/UDP, Bluetooth®, raw Manchester encoding, and any other form of wireless communication.

The SCS may allow communication between devices of varying types and platforms. Additionally, as communication may be directly between devices without transmitting data across a network, communication may be available when networks are unavailable, and communications may be protected from eavesdroppers on a network. Furthermore, direct communication between devices may avoid data charges on cellular data plans.

Referring to FIG. 1, a system 100 for transmitting messages is illustrated according to various embodiments. A first device 110 comprising an SCS 112 and a second device 120 comprising an SCS 122 are illustrated according to various embodiments. In various embodiments, SCS 112 and SCS 122 may be aftermarket software programs installed on first device 110 and second device 120. For example, a user may download an SCS app onto a smartphone or other device. However, in various embodiments, SCS 112 and SCS 122 may be embedded into a chip, such as an 802.11 wireless chip, in first device 110 and/or second device 120.

In various embodiments, the SCS may implement a standardized communication protocol ("SCP") on a device. SCP may attach an SCP header 152 to a packet in order to identify a datagram 150 as an SCP datagram. First device 110 may communicate with second device 120 via SCP. The SCS may recognize the SCP header and may follow the SCP. The SCP may define the ability for devices to discover one another, to request the transfer of raw data, to transmit confirmations on receipt of data, and to perform any other steps involved with transmitting data.

In various embodiments, the SCS may be implemented at the network layer in the Open Systems Interconnection ("OSI") model (or the Internet layer in the TCP/IP model). Regardless of the protocol being used at the transport layer (e.g. TCP, UDP, SCTP, DCCP), the SCP header may allow devices comprising an SCS to communicate via SCP.

In various embodiments, at least one of first device 110 and second device 120 may comprise a smartphone. However, in various embodiments, first device 110 and second device 120 may comprise any type of device capable of transmitting and/or receiving data.

Figure 2:
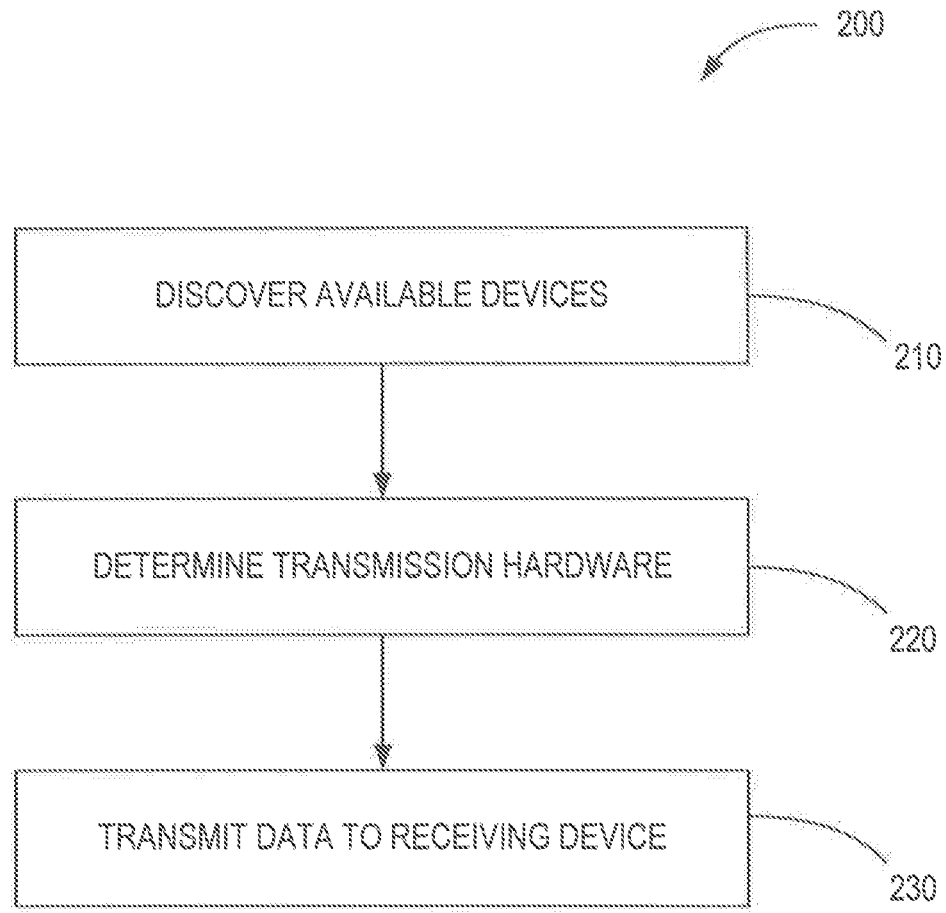
FIG. 2 illustrates a process for transmitting data between devices according to various embodiments.

Referring to FIG. 2, a process 200 for transmitting data between devices is illustrated according to various embodiments. In various embodiments, a first user may wish to transmit data from first device 110 to second device 120. The data may comprise any type of data, such as a text message, image, video, text document, or any other type of file.

First device 110 may discover available devices (step 210). First device 110 may attempt to discover other devices by a variety of methods. In various embodiments, first device 110 may discover other devices via a camera or other optical device. In various embodiments, second device 120 may display a symbol, such as a QR-code, a barcode, or text. The symbol may comprise identifying characteristics about second device 120. For example, in various embodiments the identifying characteristics may comprise at least one of a device name, an IP address of the device, an owner name, an endpoint of the device, and the available transport layers on the device. First device 110 may scan the symbol using a camera. First device 110 may obtain the identifying characteristics from the symbol and use the identifying characteristics in order to transmit data to second device 120.

In various embodiments, the SCS on first device 110 may search for other devices using a wireless chip in first device 110. Devices comprising an SCS may transmit a broadcast message. The broadcast message may comprise the identifying characteristics of the device. In various embodiments, first device 110 may be within transmission range of second device 120. The transmission range may depend on the specific type of wireless chips in first device 110 and second device 120. However, in various embodiments, the transmission range may be up to about 200 feet-300 feet. The SCS may open a socket on first device 110 to listen for broadcast messages. The broadcast message may be sent by a variety of hardware. For example, the broadcast message may be transmitted via an 802.11 wireless chip, Bluetooth® chip, or NFC.

In various embodiments, first device 110 and second device 120 may not be within transmission range of each other. However, an intermediary device, such as a smartphone equipped with hotspot technology, may be within transmission range of first device 110. First device 110 may search for available devices by transmitting a message to intermediary device, instructing intermediary device to look for available devices. Intermediary device may receive a broadcast message from second device 120, and intermediary device may transmit the broadcast message to first device 110. Thus, first device 110 may discover second device 120 without connecting to the internet or a cellular network even though first device 110 may not be within transmission range of second device 120. In various embodiments, any number of intermediary devices may be daisy-chained, such that first device 110 may discover second device 120 from miles apart by transmitting data via a series of intermediary devices.

First device 110 may display a list of all discovered devices to the user. The user may select second device 120 in order to transmit data to second device 120. The user may select a file or message to be transmitted to second device 120.

The SCS 112 on first device 110 may determine the transmission hardware to utilize for the transmission (step 220). In various embodiments, first device 110 and second device 120 may each have only one type of transmission hardware, such as an 802.11 wireless chip, and the SCS 112 may thus select the 802.11 wireless chip to transmit the data. However, in various embodiments, multiple transmission paths may be available between first device 110 and second device 120. For example, first device 110 and second device 120 may each comprise an 802.11 wireless chip and a Bluetooth® chip. In various embodiments, the SCS 112 may determine the fastest transmission path, and may select the fastest transmission path to transmit the data. In various embodiments, the transmission path may be selected by default settings. For example, SCS 112 may always select an 802.11 wireless path for transmission when available, and if the 802.11 wireless path is not available, SCS 112 may select a Bluetooth® path. However, in various embodiments, the SCS 112 on first device 110 may transmit a speed test message to second device 120 via each available transmission path, and the SCS 112 may select the fastest transmission path based on the speed test results.

In various embodiments, the SCS 112 may instruct first device 110 to send the data to second device 120 via multiple transmission paths. A message may be divided into multiple packets. SCS 112 may analyze the available transmissions paths and send the message over multiple transmission paths in order to expedite transmission of the entire message. For example, SCS 112 may determine that the fastest method of transmitting the message may be to transmit 90% of the packets via an 802.11 wireless path, and 10% of the packets over a Bluetooth® path. SCS 112 may attach an SCP header to each packet being transmitted to second device 120, whether via 802.11 wireless or Bluetooth®. Thus, SCS 122 on second device 120 may recognize the packets as being received by SCP, and SCS 122 may reassemble the packets in order to recreate the entire message. In various embodiments, SCS 112 may analyze all transmission paths available, including but not limited to multiple 802.11 wireless chips, Bluetooth® chips, NFC, PDQ, or any other transmission paths in order to select the fastest transmission method. The SCS on first device 110 may initiate a file send protocol and transmit the data to second device 120 (step 230).

In various embodiments, first device 110 and second device 120 may be connected to the same local network. First device 110 may transmit a link, such as a QR-code, over a cellular network or the local network to second device 120. In various embodiments, the link may comprise 10 kb or less of data. Second device 120 may use the link to request or accept a file transfer. First device 110 may transmit a file over the local network. In various embodiments, the file may be transferred using TCP/IP directly over the local network.

In various embodiments, second device 120 may have access to an internet connection. First device 110 may transmit a link over a cellular transmission path to second device 120, and second device 120 may use the link to download a file stored on the cloud and/or on a server over the internet. In various embodiments, second device 120 may download the file using TCP/IP.

In various embodiments, first device 110 may sync its contents with a cloud database. In various embodiments, first device 110 may comprise an SCS folder, and only files stored in the SCS folder may be synced with the database. First device 110 may transmit a link over a cellular transmission path to second device 120 identifying a file stored on the database. In various embodiments, second device 120 may not have access to an 802.11 wireless network at the time second device 120 receives the link. Second device 120 may use the link to access the file whenever second device 120 gains access to an 802.11 wireless network in order to prevent cellular data charges. In various embodiments, second device 120 may use the link to access the file over the cellular network. In various embodiments, second device 120 may stream all or part of the file over either the cellular network or an 802.11 wireless network.

In various embodiments, first device 110 may share an online folder with second device 120. First device 110 may indicate that second device 120 may have access to an online folder. First device 110 may sync with the online folder to upload files stored on first device 110 to the online folder. Second device 120 may sync with the online folder to download files stored in the online folder to second device 120.

Figure 3:
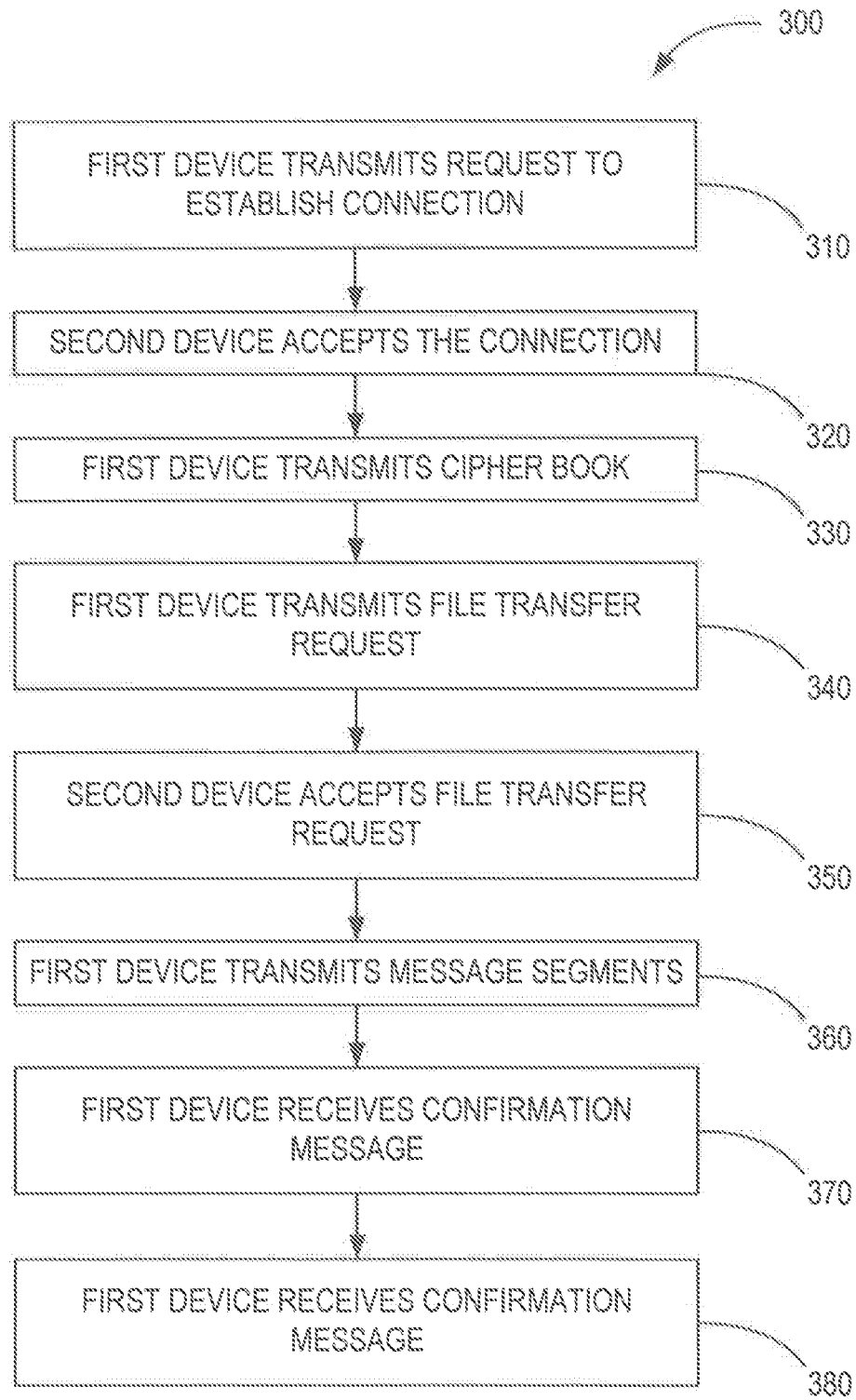
FIG. 3 illustrates a process for a file send protocol according to various embodiments.

Referring to FIG. 3, a process 300 for a file send protocol is illustrated according to various embodiments. First device 110 may transmit a request to establish a connection with second device 120 (step 310). In various embodiments the connection may comprise a TCP connection. However, in various embodiments, the connection may comprise any type of connection for transmitting data between devices. Second device 120 may accept the connection request (step 320). In various embodiments, the connection may be between secure sockets on first device 110 and second device 120.

In various embodiments, first device 110 may transmit a message comprising a cypher book to second device 120 (step 330). The cypher book may comprise a list of one-time cyphers and may allow second device 120 to decrypt data sent to second device 120 over the secure socket connection using one-time cyphers. In various embodiments, first device 110 may encrypt the message comprising the cypher book using known encryption methods, such as Advanced Encryption Standard ("AES") or RSA encryption. However, subsequent messages during the transfer session may be encrypted using the one-time cyphers contained in the cypher book. The messages encrypted using the one-time cyphers may be encrypted and decrypted using significantly less processing power and time than messages encrypted with AES or RSA. Additionally, the messages sent using the one-time cyphers may be indecipherable to parties not containing the cypher book.

First device 110 may send a file transfer request (step 340). For an example of a file transfer request, refer to FIG. 5. Second device 120 may accept the file transfer request (step 350). In response to second device 120 accepting the file transfer request, first device 110 may break the file into segments, and begin transmitting the segments to second device 120 (step 360). After first device 110 has transmitted all segments of the file, first device 110 may wait for confirmation that second device 120 has received all segments. Second device 120 may transmit a confirmation message to first device 110 indicating that all segments have been received (step 370). Second device 120 may decrypt and reassemble the segments according to SCP in order to recreate the file (step 380).

Referring to FIG. 4, an example of a discovery protocol 400 is illustrated according to various embodiments. Discovery protocol 400 may be implemented on the transport layer using TCP/UDP. However, in various embodiments, discovery protocols may be implemented using a Bluetooth® serial port, RS-232, or may be sent entirely over datagrams or a Windows® Socket API ("WSA"). The LocalClient in the illustrated embodiment may be a new instance of an IDiscoveredClient (defined in FIG. 5) class filled in with the device's identifying characteristics, such as device name, user name, preview image, and endpoint (in this case an IP address and port). First device 110 may open a new socket for a broadcast message (410). First device 110 may transmit the IP address that first device 110 is listening on for a response to the broadcast message (420). First device 110 may open a new datagram socket to listen for a response message (430). After receiving a response message, first device 110 may decipher the response message into the original IDiscoveredClient message that first device 110 sent (440).

Referring to FIG. 5, a definition for an example discovery protocol 500 is illustrated according to various embodiments. The definition may be a single common class called IDiscoveredClient that may be implemented by a transmitting device and a receiving device. In various embodiments, the definition may be expanded to include custom fields and any other information that users may desire. In various embodiments, the definition may comprise a name of the device (510), an IP address of the device (520), an owner of the device (530), and endpoint of the device (540), and a transport layer on which the device was discovered (550). However, one skilled in the art will appreciate that the particular fields used may be altered to any desired fields.

Referring to FIG. 6, a definition for an example file transfer request protocol 600 is illustrated according to various embodiments. The definition may be called "IFileTransferRequest." In various embodiments, the definition may comprise the name of the device transmitting a file (610), the filename to be sent (620), the size of the file (630), the device receiving the file (640), a unique identification for the file transfer (650), and the transport layer associated with the file transfer (660).

Referring to FIG. 7, a definition for a response to a file transfer request 700 is illustrated according to various embodiments. The receiving device may respond with a definition called IFileTransferResponse to indicate that the receiving device is willing to accept the file transfer. In various embodiments, IFileTransferResponse may comprise the response from the user (710) and the unique identification for the file transfer (720). The transmitting device may receive the response from the receiving device, and the transmitting device may proceed to transmit the file to the receiving device. Once a complete file transfer has occurred, the receiving device may transmit a confirmation to the transmitting device (730).

Figure 8:
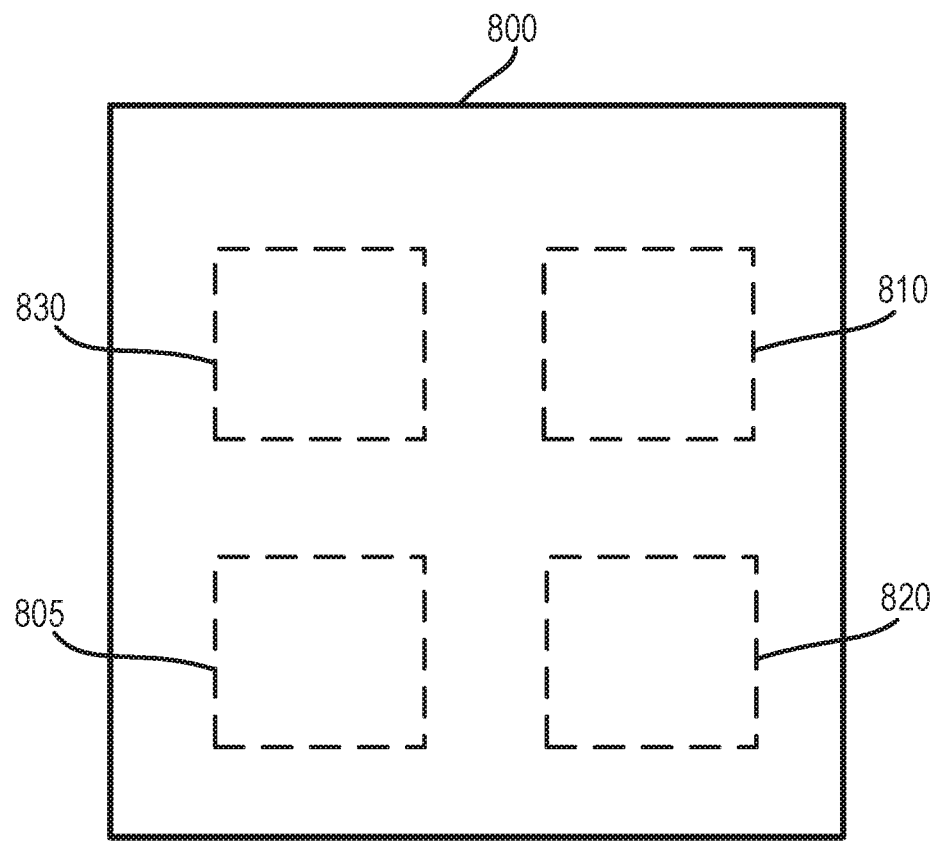
FIG. 8 illustrates a portable storage device according to various embodiments.

Referring to FIG. 8, a portable storage device ("PSD") 800 is illustrated according to various embodiments. PSD 800 may comprise any type of portable device which is capable of storing information. For example, and in accordance with various embodiments, the PSD 800 may support modular configurations, and/or may comprise an external housing, a case for a mobile computing device (e.g., a tablet, smartphone, smart watch, laptop, etc.), and/or the like, similar to the portable storage devices disclosed in U.S. Ser. No. 15/644,556 entitled PORTABLE STORAGE DEVICE WITH MODULAR POWER AND HOUSING SYSTEM and filed on Jul. 7, 2017, the contents of which are herein incorporated by reference in its entirety. PSD 800 may also comprise a wearable device, a watch, necklace, phone case, smartphone, laptop/notebook, mobile workstation, implanted chips, clothing item, wallet, etc.

The PSD 800 may comprise a storage module 810, a communication module 820, a processor 830, and a battery 805. The storage module 810 may comprise a memory card. For example, the storage module 810 may comprise an SD card, an xD card, a CompactFlash card, or any other suitable memory card. The storage module 810 may comprise an internal memory, such as iSSD, SSD, iNAND, or flash SD. The communication module 820 may comprise one or more components capable of wireless communication. For example, the communication module may comprise an 802.11 or 802.2(2) wireless chip, a Bluetooth® chip, an NFC chip, etc. The processor 830 may comprise any combination of hardware and/or software capable of providing instructions to the storage module 810 and the communication module 820.

The PSD 800 may comprise a standard communication system ("SCS") as previously described herein. The SCS may be any combination of hardware and/or software which is capable of communicating via a standard communication protocol ("SCP") as previously described herein. In various embodiments, the SCS may be implemented on at least one of the storage module 810, the communication module 820, or the processor 830. The PSD 800 may wirelessly receive and transmit files and communications from other devices, such as smartphones, televisions, game consoles, tablets, personal computers, printers, etc. Due to the SCS, the PSD 800 may not be limited to communicating with any particular brand or manufacturer of device. In contrast, the PSD 800 may communicate across platforms, such as with Apple® devices, Android® devices, Windows® devices, UNIX® devices, or any other suitable devices.

In various embodiments, the PSD 800 may allow a user to access their files wherever the user goes. For example, a user may have a document stored on a laptop computer. The user may transmit the document from the laptop computer to the PSD 800 using the SCS. The PSD 800 may store the document in the storage module 810. The user may then transmit the document from the PSD 800 to another device, such as a smartphone, using the SCS.

In various embodiments, the PSD 800 may communicate directly with other devices without using a network. Thus, information may be transmitted securely between the PSD 800 and other devices. However, in various embodiments, the PSD 800 may communicate over a network using a wireless chip in the communication module 820. The communication module 820 may comprise two wireless chips, allowing the PSD 800 to simultaneously communicate over a network on a first wireless chip and directly to another device on a second wireless chip.

In various embodiments, the PSD 800 may allow data to be transferred from a device to the PSD 800 without storing the data on the device. For example, a smartphone may capture a picture and transmit the picture directly to the PSD 800 using the smartphone's RAM without storing the picture on the hard drive of the smartphone. Thus, the smartphone may be lost, stolen, sold, or donated without risk of a third-party obtaining the picture, or other data which is stored on the PSD 800 and not the smartphone. Similarly, a user may initiate an SCS on a device, such as a laptop, and open a file stored on the PSD 800 using the device. The user may edit the file on the device and save the edited file directly on the PSD 800 without saving the edited file on the device.

A user may use the PSD 800 to store all of the user's files. Regardless of what device a user is using to access the files on the PSD 800, the user may create, edit, and delete files directly on the PSD 800 using another device, such as a personal computer. In various embodiments, the PSD 800 may emulate a network drive. Thus, the PSD 800 may be able to communicate with devices which are not capable of downloading or installing custom software. For example, the PSD 800 may emulate a DLNA media service, or a Windows® network. The PSD 800 may require a password to be entered on the device, and the device may then access files stored on the PSD 800.

In various embodiments, the PSD 800 may automatically sync when charging the battery 805 and may charge wirelessly or on a charging cable. The PSD 1010 may reach a predefined battery level prior to initiating the sync. For example, when placed on a charger, the PSD 1010 may initiate a sync in response to the battery level reach at least 50%, or at least 90%. The PSD 1010 may sync to any location specified by a user, such as the server 1030, a local device, or another PSD.

In various embodiments, PSD 800 may comprise any suitable form factor having any suitable size and shape. For example, and with reference to FIGS. 9A-9C, a PSD 900 may comprise a housing 902. Housing 902 may be made from materials including metals, plastics, and/or rubbers. For example, housing 902 may be made from stamped and fused sheets of aluminum, molded plastic, or other suitable materials. Housing 902 may also be made from thermally conductive materials to enhance heat dissipation. In various embodiments, housing 902 may have rectangular cuboid geometry or rhomboid geometry with 6 sides. Each side may have dimensions substantially congruent to the side opposite each side's internal surface. In that regard, housing 902 may comprise three pairs of sides having similar dimensions. The small dimensions of housing 902 may lend it to use in a modular storage and power solution described in greater detail below. The perimeter of surface 915 as well as other surfaces of housing 902 may be bounded by rounded edges 919.

The surfaces of housing 902 may leave exposed various interfaces and components. For example, surface 905 of housing 902 may include electronic interface panel 904. Electronic interface panel 904 may further include conductive pads 906 disposed slightly proud from, flush with, or slightly recessed from surface 905. Conductive pads 906 may form an electrical connection with conductive pins and/or conductive pads formed on an opposing surface in contact with or near to surface 905. In various embodiments, electronic interface panel 904 may further comprise a data port 908 exposed from housing 902. Data port 908 may be configured to transmit power and/or signals over electronic connections in a predetermined format. For example, data port 908 may use a protocol such as USB, firewire, lightning cable, SATA, PCIe, or other suitable cable interface for data and/or power transfer. Data port 908 may also use a proprietary pin configuration and slot geometry.

Figure 9A:
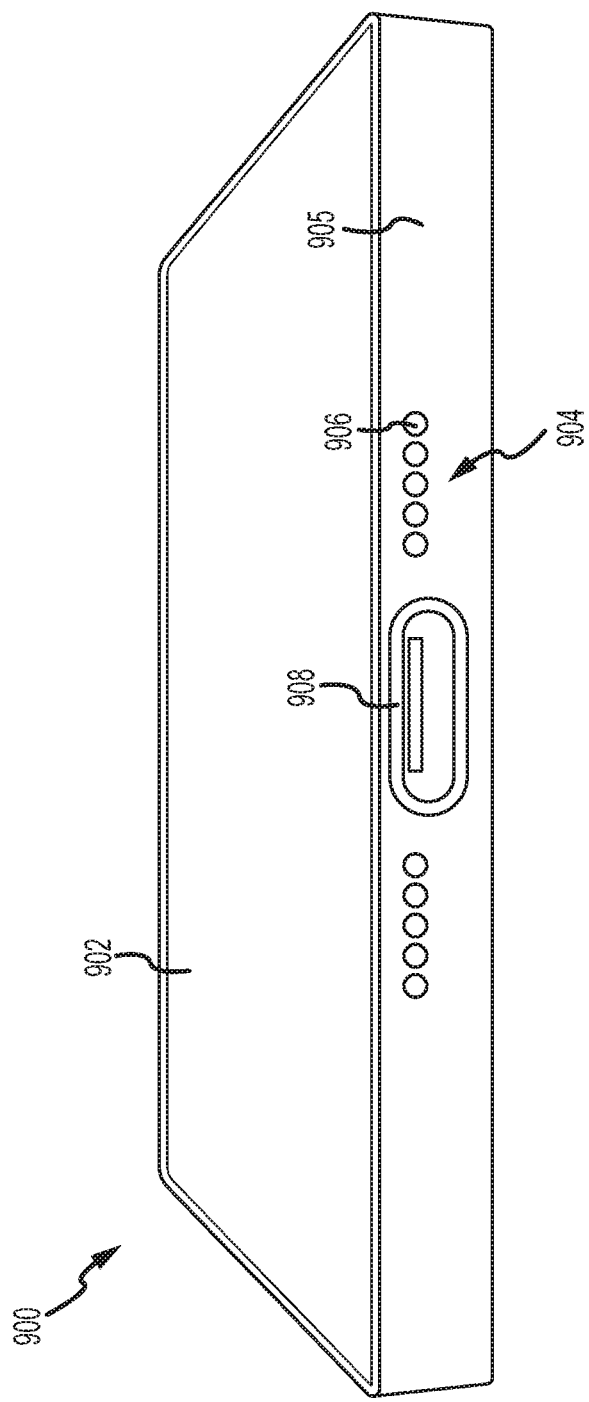
FIGS. 9A-9C illustrate a portable storage device suitable for electronic and mechanical coupling to various components in a modular portable storage system according to various embodiments.
Figure 9B:
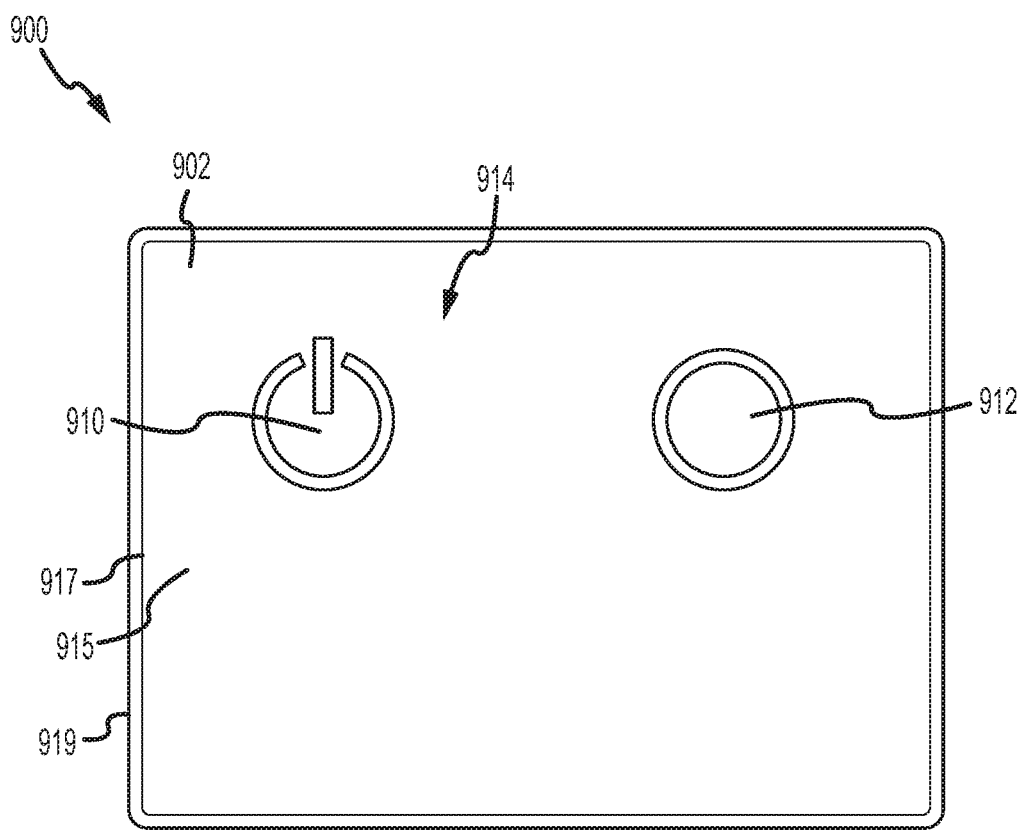
Figure 9C:
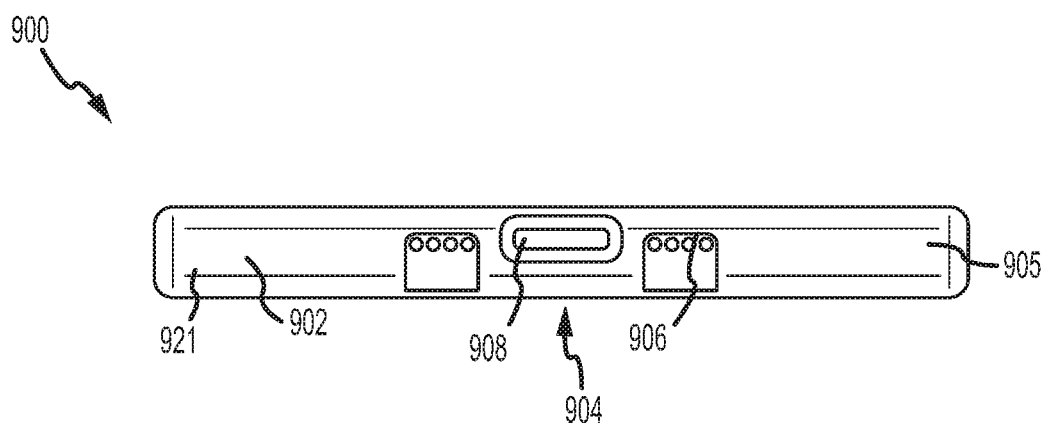

In various embodiments, housing 902 may further include surface 915 having a rectangular geometry as depicted in a top view by FIG. 9B. Surface 915 may include human I/O interface 914 comprising a power button and/or light source 910 and an interface button and/or light source 912. Lighting may come from a light emitting diode or other low energy consumption lighting source. Power button 910 and interface button 912 may comprise capacitive touch buttons, actuating buttons, or other input mechanisms suitable for touch control by a user. Housing 902 may also retain a microphone or other I/O device in various embodiments so that users may thus interact with portable storage device 900 using voice commands, for example. Referring now to FIG. 9C, an elevation view of housing 902 is shown, in accordance with various embodiments. Electronic interface panel 904 may be defined in surface 921 with conductive pads 906 and data port 908 exposed from surface 921. The components defined in surface 921 may be displaced from the edges of surface 921 at symmetric and/or asymmetric locations on surface 921.

Figure 10A:
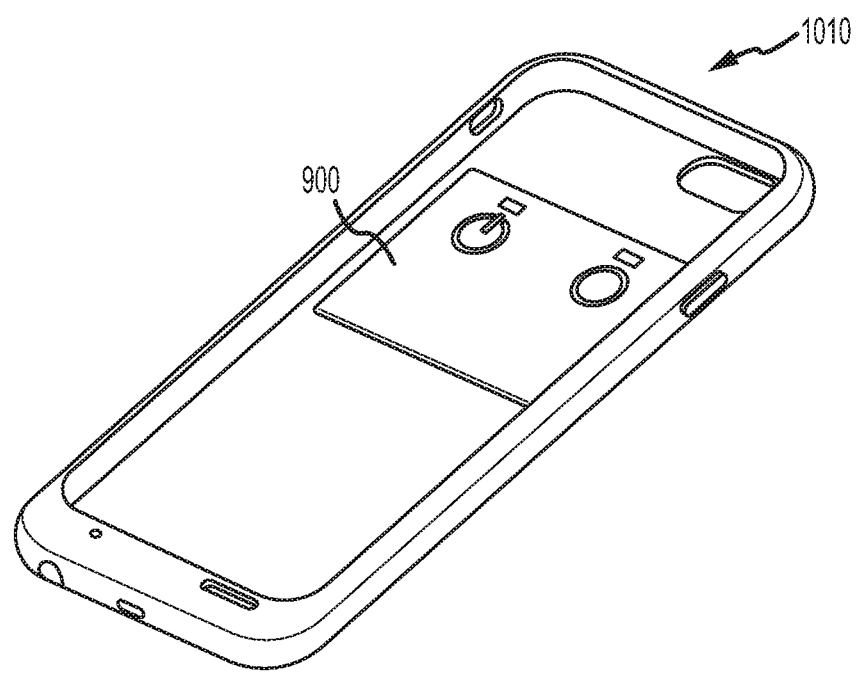
FIGS. 10A-10C illustrate a portable storage assembly comprising a case for mechanical attachment to a mobile device with a cavity suitable to retain a portable storage device according to various embodiments.
Figure 10B:
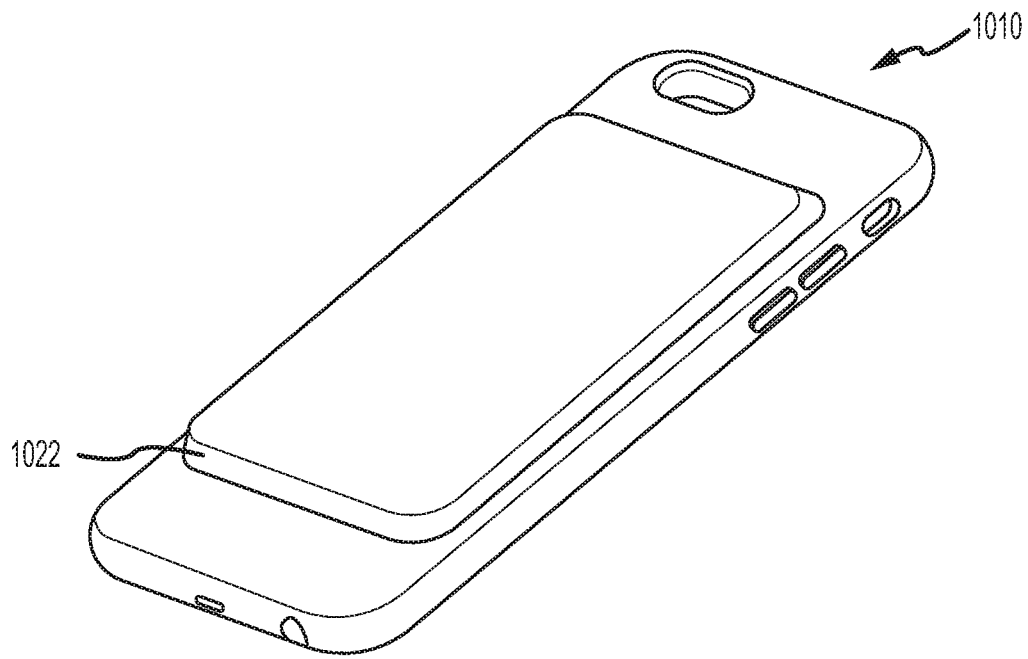
Figure 10C:
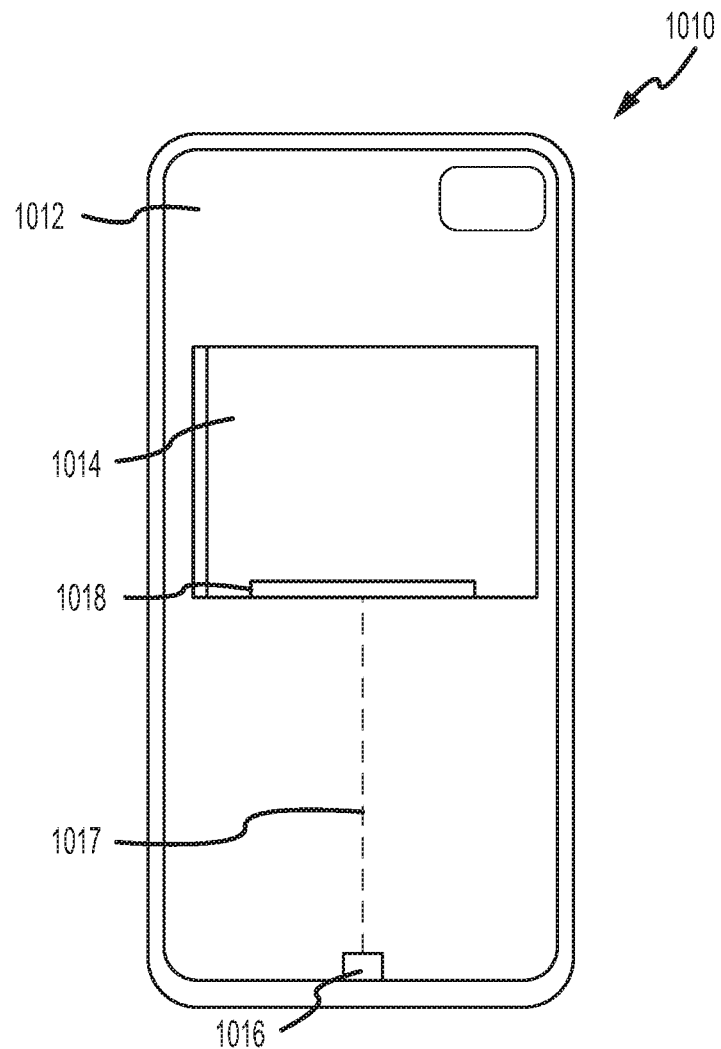

Referring now to FIGS. 10A-10C, a case 1012 for a mobile computing device is shown as a portable storage assembly 1010, in accordance with various embodiments. Case 1012 may fit on a portable computing device such as, for example, a tablet, smartphone, smart watch, laptop, or other suitable computing device. Case 1012 may have an interior contour matching that of a computing device to retain the computing device. Case 1012 may define one or more openings on the exterior surface to allow for access to inputs, outputs, buttons, and the like of the computing device, in response to the computing device being retained within case 1012. For example, case 1012 may define an opening to allow the computing device to interface with a power source (e.g., USB Type-C interface, APPLE IPHONE® Lightning Connector, etc.), a 3.5 mm audio input, or the like while the computing device is retained within case 1012. Case 1012 may define a cavity 1014 with a shape suitable to receive and retain the PSD 900. In that regard, PSD 900 may be removably coupled to case 1012, and cavity 1014 may have a geometry mirroring 5 sides of the portable storage device with an opening shaped like a surface of the portable storage device. The cavity may thus be defined by five orthogonal surfaces. PSD 900 may lie with a surface flush with the interior of case 1012.

In various embodiments, case 1012 may include an interface 1018 suitable for communication with data port 908 or conductive pads 906 (e.g., of FIGS. 9A-9C). Interface 1018 may by electronically coupled to a data plug 1016 by an electrical conduit 1017 such as a wire. Data plug 1016 may interface with a corresponding data port on a computing device retained within case 1012. Data plug 1016 may thus plug into the bottom port on a smartphone to electrically couple case 1012 to the smartphone, for example. Case 1012 may further include a protrusion 1022 configured to house the PSD 900 and related components (e.g. power supply) described herein as well as the cavity 1014.

In various embodiments, case 1012 may enable electronic communication between portable storage device 900, a power supply, a printed circuit board PCB ("PCB"), or other electronic devices retained within case 1012. Case 1012 may further enable electronic communication of power and/or data to and/or from the mobile device retained within case 1012. Portable storage device 900 may also be in wireless communication with the mobile device retained within case 1012 as described herein.

In various embodiments, PSD 900 may also comprise modular components to be coupled together, such as a primary module and a secondary module. The primary module may comprise computing components, such as a processor, hard drive, wireless chip, battery, etc. Various secondary modules may be removably coupled to the primary module, such as batteries, charging stations, storage units, LTE hotspot devices, cover plates, cameras, virtual reality units, speakers, video screens, user interfaces, etc. The secondary modules may comprise connection posts which mate with receiving slots in the primary module to couple the primary and secondary components together. An alignment post on the secondary module may mate with an alignment depression in the primary module. Metallic pins on the secondary module may contact pads on the primary module to allow for the exchange of electronic signals between the primary module and the secondary module.

The primary module may wirelessly receive and transmit files and communications from other devices, such as cameras, smartphones, televisions, game consoles, tablets, personal computers, printers, etc. The primary module may communicate across platforms, such as with Apple® devices, Android® devices, Windows® devices, UNIX® devices, or any other suitable devices. In various embodiments, the primary module may allow a user to access their files wherever the user goes. For example, a user may have a document stored on a laptop computer. The user may transmit the document from the laptop computer to the primary module wirelessly. In various embodiments, the primary module may communicate directly with other devices without using a network. Thus, information may be transmitted securely between the primary module and other devices. However, in various embodiments, the primary module may communicate over a network using a wireless chip in the primary module. For more information regarding the capabilities of a primary module, see U.S. patent application Ser. No. 15/367,961 titled "SYSTEMS AND METHODS FOR MEMORY CARD EMULATION," and filed on Dec. 2, 2016, the contents of which are incorporated by reference herein in their entirety.

Figure 11:
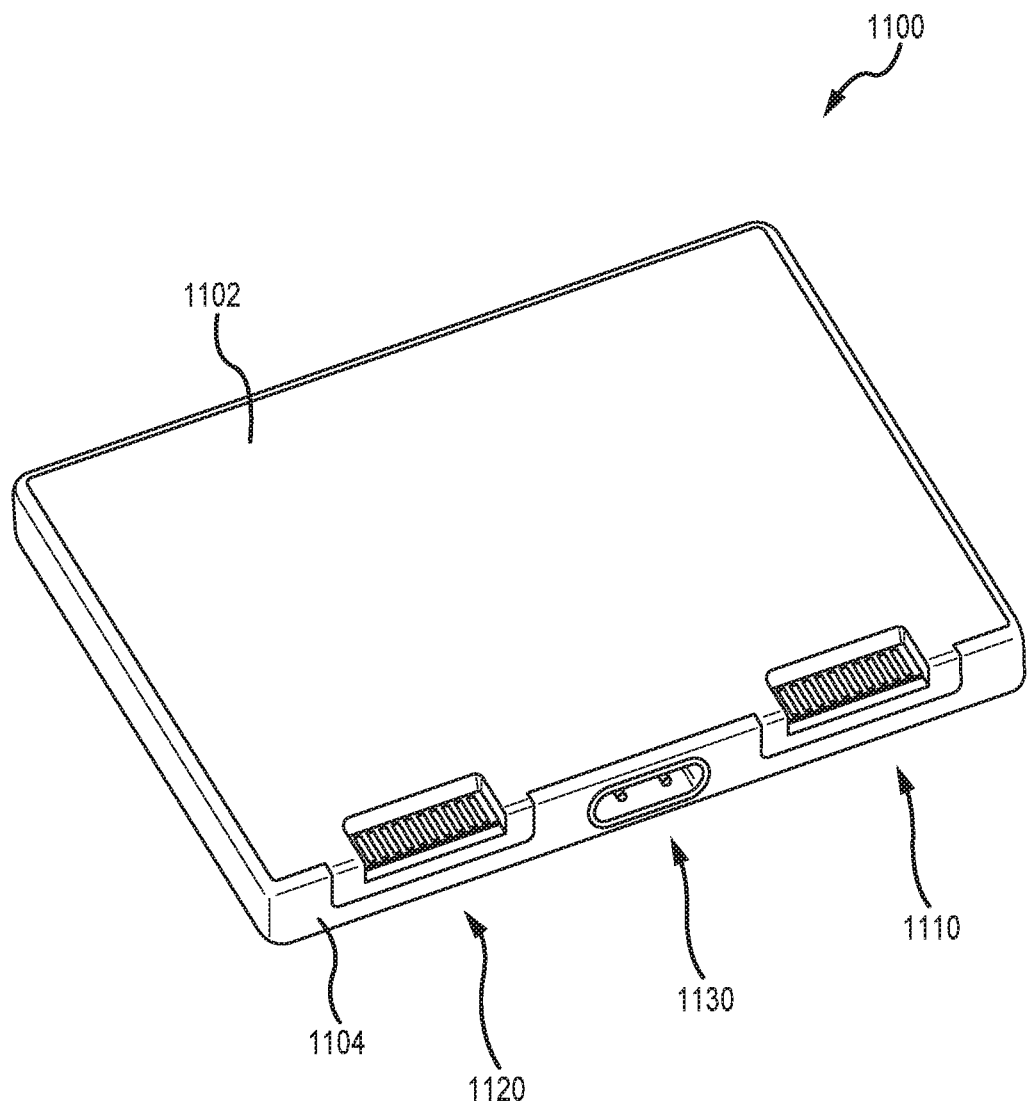
FIG. 11 illustrates a perspective view of a primary module comprising an edge pin configuration according to various embodiments.

Referring to FIG. 11, a perspective view of a primary module 1100 comprising an edge pin configuration is illustrated according to various embodiments. One such exemplary edge pin configuration and connector assembly is disclosed in U.S. patent application Ser. No. 16/164,468 entitled "PORTABLE ELECTRONIC DEVICE CONNECTION SYSTEMS," and filed Oct. 18, 2018, the contents of which are incorporated herein by reference. The primary module 1100 may comprise computing components, such as a processor, hard drive, wireless chip, battery, etc. The primary module 1100 may generally comprise the shape of a rectangular cuboid, such that the primary module 1100 comprises six sides, each of which are rectangular. The primary module 1100 may comprise a first pin set 1110 and a second pin set 1120. The first pin set 1110 and the second pin set 1120 may be located at a junction between a top side 1102 and a front side 1104 of the primary module 1100. The first pin set 1110 and the second pin set 1120 may be configured to contact corresponding pins in a secondary module.

The primary module 1100 may further comprise a connection port 1130. The connection port 1130 may be configured to receive a cord to connect the primary module 1100 to other components, such as a computer, camera, printer, etc. In various embodiments, the connection port 1130 may be a USB Type C port, any other USB Type port, a serial port, or any other type of connection port capable of connecting to other devices. However, the USB Type C port allows the primary module to be constructed in a very thin package. For example, in various embodiments, a height of the primary module 1100 is less than 0.3 inches. In various embodiments, the connection port 1130 may be located on the front side 1104 of the primary module 1100 between the first pin set 1102 and the second pin set 1104.

Figure 12:
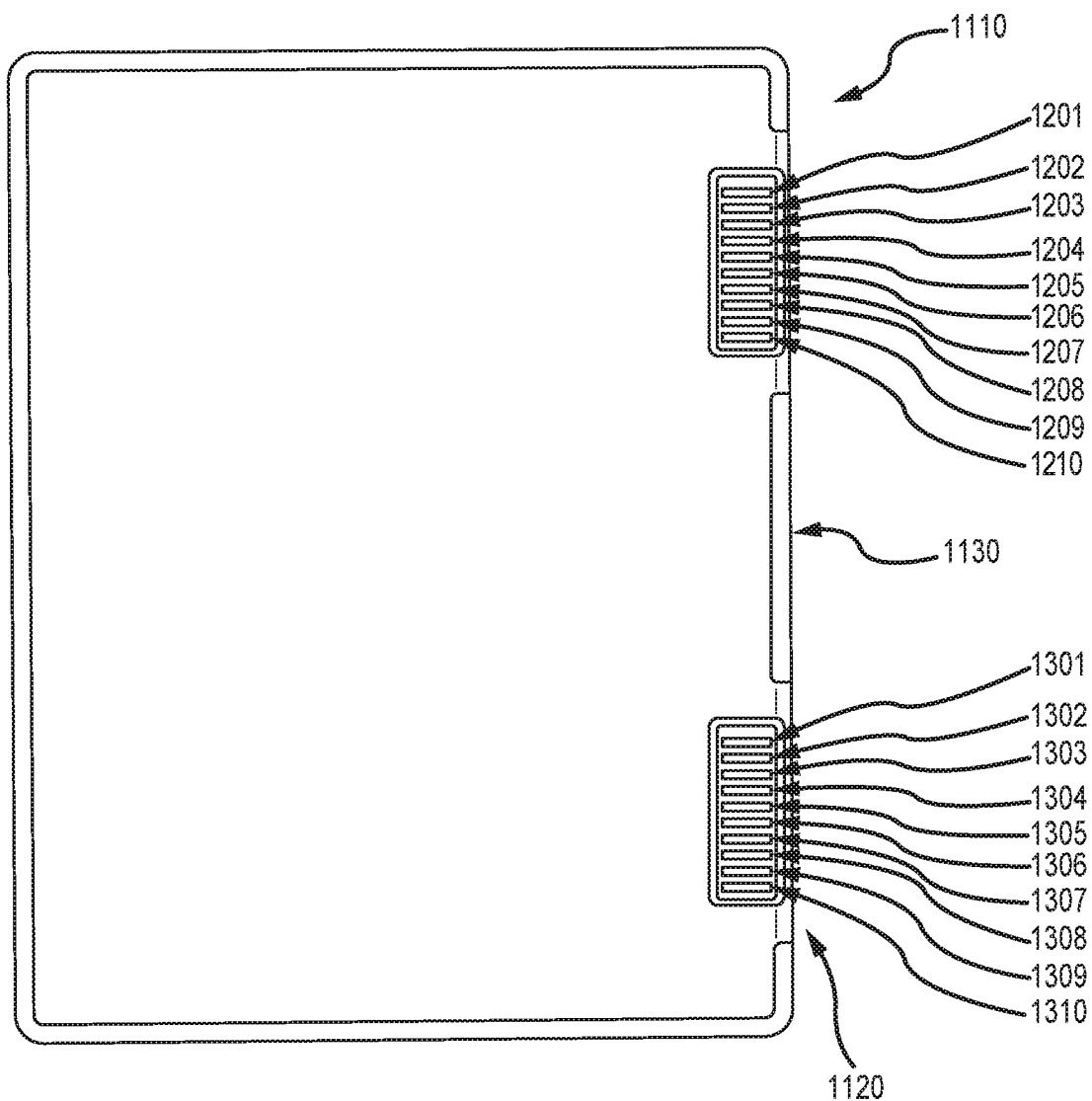
FIG. 12 illustrates a pin diagram of the primary module of FIG. 11, according to various embodiments.

Referring to FIG. 12, a pin diagram of the primary module 1100 is illustrated according to various embodiments. The first pin set 1110 may comprise a first pin 1201, a second pin 1202, a third pin 1203, a fourth pin 1204, a fifth pin 1205, a sixth pin 1206, a seventh pin 1207, an eighth pin 1208, a ninth pin 1209, and a tenth pin 1210. The second pin set 1120 may comprise a first pin 1301, a second pin 1302, a third pin 1303, a fourth pin 1304, a fifth pin 1305, a sixth pin 1306, a seventh pin 1307, an eighth pin 1308, a ninth pin 1309, and a tenth pin 1310.

For the first pin set 1110, the first pin 1201 may comprise a battery pack positive pin, the second pin 1202 may comprise a battery pack positive pin, the third pin 1203 may comprise a system ground pin, the fourth pin 1204 may comprises a USB 2.0 Data (+) pin, the fifth pin 1205, may comprise a USB 2.0 Data (-) pin, the sixth pin 1206 may comprise a system ground pin, the seventh pin 1207 may comprise a UART data receive pin, the eighth pin 1208 may comprise a UART data transmit pin, the ninth pin 1209 may comprise a system ground pin, and the tenth pin 1210 may comprise a system ground pin.

For the second pin set 1120, the first pin 1301 may comprise an external power positive pin, the second pin 1302 may comprise an external power positive pin, the third pin 1303 may comprise a battery pack temperature sensor pin, the fourth pin 1304 may comprise an on switch/signal (low) pin, the fifth pin 1305 may comprise a reset signal (low) pin, the sixth pin 1306 may comprise a mode select (low) pin, the seventh pin 1307 may comprise a serial com data pin, the eighth pin 1308 may comprise a serial com clock pin, the ninth pin 1309 may comprise a system ground pin, and the tenth pin 1310 may comprise a system ground pin.

Figure 13:
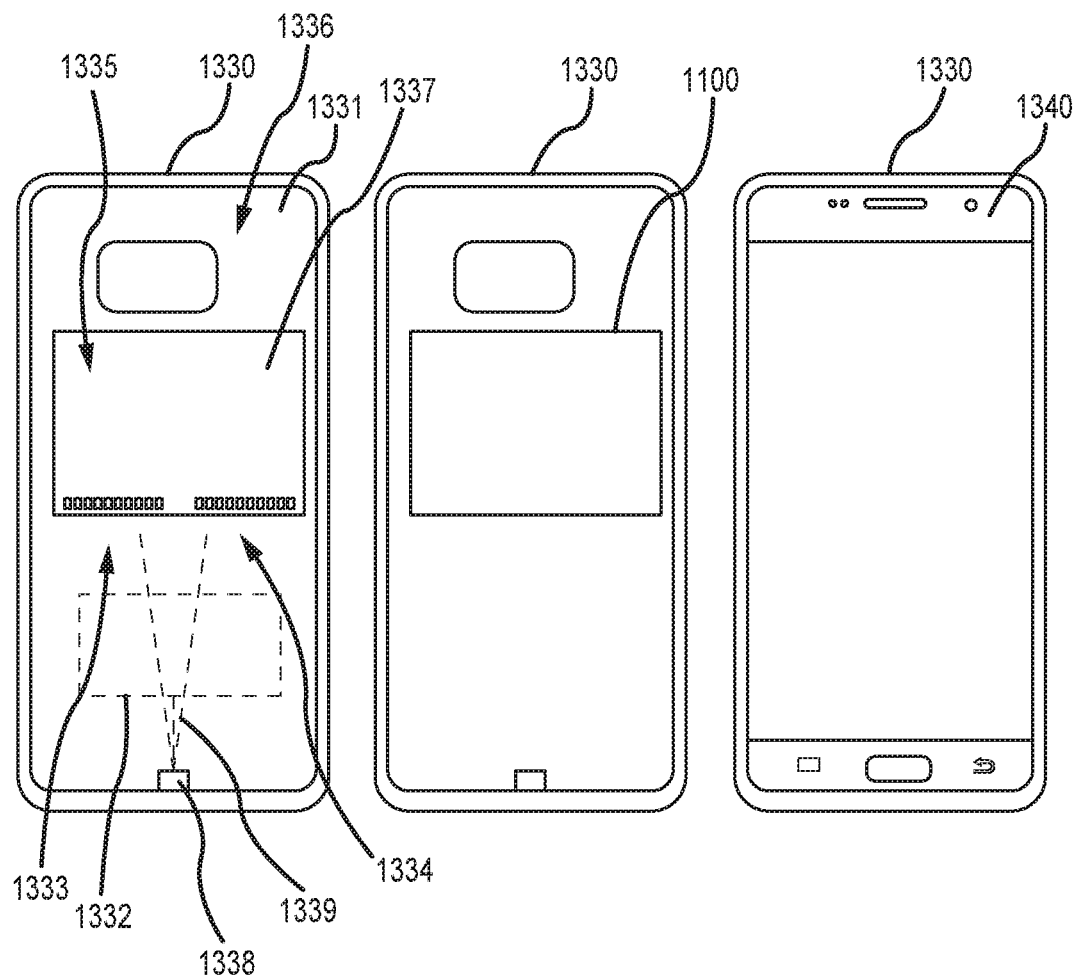
FIG. 13 illustrates a phone case with a primary module and a phone, according to various embodiments.

Referring to FIG. 13, a phone case 1330, the phone case 1330 with the primary module 1100 installed in the phone case 1330, and a phone 1340 installed in the phone case 1330 are illustrated according to various embodiments. The phone case 1330 may function as a secondary module to the primary module 1100. The phone case 1330 may be manufactured to the desired dimensions in order to fit any particular phone model. The phone case 1330 may comprise a housing 1331, with a battery 1332 located within the housing. In various embodiments, the battery 1332 may be permanently encapsulated within the housing 1331. However, in various embodiments, the battery 1332 may be removable from the phone case 1330.

The phone case 1330 may comprise a first pin set 1333 and a second pin set 1334. The first pin set 1333 and the second pin set 1334 may be configured to interface with the pins on the primary module 1100. In various embodiments, the first pin set 1333 and the second pin set 1334 on the phone case 1330 may be male pins, and the pins on the primary module 1100 may be female pins. In various embodiments, the pins on the primary module 1100 may be male pins, and the first pin set 1333 and the second pin set 1334 may be female pins.

The phone case 1330 may comprise a module reception cavity 1335. The module reception cavity 1335 may be configured to receive the primary module 1100. The module reception cavity 1335 may comprise the same size and shape as the primary module 1100. The phone case 1330 may further comprise a phone reception cavity 1336 which is configured to receive the phone 1340. The module reception cavity 1335 may comprise a back wall 1337 which is configured to keep the primary module 1100 within place between the back wall 1337 and the phone 1340 when the phone 1340 is inserted within the phone reception cavity 1336.

The phone case 1330 may comprise a phone jack 1338. The phone jack 1338 may be configured to electrically connect the battery 1332 and/or primary module 1100 to the phone 1340 via a connection port in the phone 1340. The connection port may be a standard port typically used to charge and transfer data to/from the phone 1340. The phone case 1330 may comprise internal wires 1339 which connect the primary module 1100, the battery 1332, and the phone jack 1338.

Figure 14:
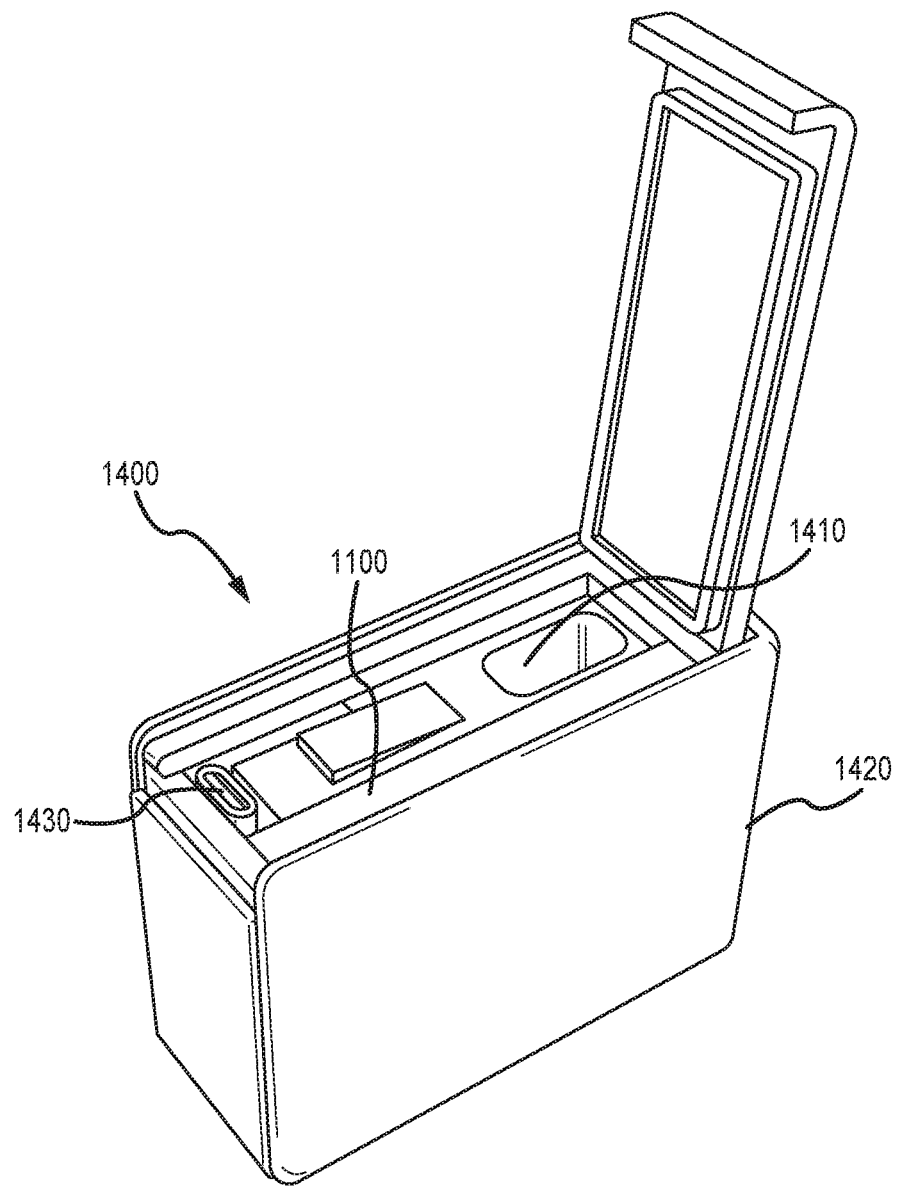
FIG. 14 illustrates a secondary module comprising a battery, according to various embodiments.

Referring to FIG. 14, the primary module 1100 is shown inserted in a secondary module 1400 comprising a battery 1410. The secondary module 1400 may comprise a housing 1420 which may enclose the primary module 1100 and the battery 1410. The secondary module 1400 may comprise a first reception cavity configured to receive the primary module 1100, and a second reception cavity configured to receive the battery 1410. In various embodiments, the battery 1410 may be permanently installed within the housing 1420, or the battery 1410 may be removably installed in the housing 1420. The secondary module 1400 may comprise a connection port 1430, such as a USB Type C port, which allows the secondary module 1400 to electrically connect to a power source (e.g., an electrical outlet) to charge the battery 1410 or transfer data to other components, such as computers, using a cord. The battery 1410 may provide power to the primary module 1100 when the primary module 1100 is installed within the secondary module 1400. The secondary module 1400 may also comprise pins configured to mate with the pins previously described on the primary module 1100, and/or the secondary module 1400 may comprise wires which electrically connect the primary module 1100, the battery 1410, and the connection port 1430.

As previously discussed, the primary module 1100 may be capable of wirelessly communicating with other devices. However, in various embodiments, the primary module 1100 may be able to transfer and receive data faster using a wired connection rather than a wireless connection. Thus, by electrically connecting the primary module 1100 to the phone as shown in FIG. 13, or by electrically connecting the primary module 1100 to an external device using a cable as describe in FIG. 14, the primary module 1100 may be able to more quickly transfer and receive data.

Those skilled in the art will recognize that various pin configurations may be utilized. Additionally, although only two secondary modules have been illustrated, many different sizes, shapes, and functions of secondary modules may couple to the primary module. Although the illustrated embodiments comprise connection posts and pins on the secondary modules, in various embodiments, the connection posts and/or the pins may be located on the primary module, and the receiving slots and/or contact pads may be located on the secondary modules.

Figure 15:
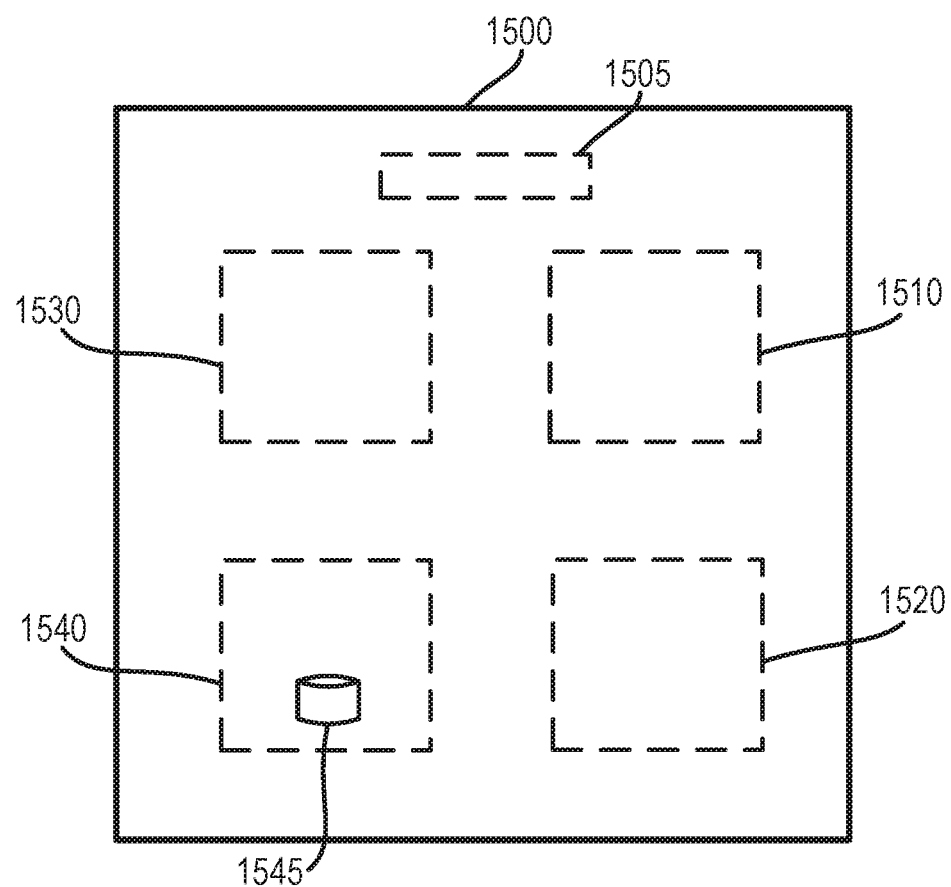
FIG. 15 illustrates a portable storage device for encrypting data, according to various embodiments.

In various embodiments, and with reference to FIG. 15, a PSD 1500 is illustrated. PSD 1500 may variously include features and functionality described herein. PSD 1500 may be configured to encrypt data stored on PSD 1500 to partially prevent third parties and hackers from accessing and viewing the data. PSD 1500 may also be configured to decrypt the encrypted data to allow an authorized user access to the encrypted data. Although the present disclosure discusses encrypting data on PSD 1500, it should be understood that the present systems and methods may be applied to encrypt data, both stored and transmitted, in any suitable environment, computer based system, database, or the like. PSD 1500 may comprise a storage module 1510, a communication module 1520, a processor 1530, a battery 1505, and/or an encryption module 1540. PSD 1500 may further comprise any other component, capability, and/the like, as discussed herein, such as a battery.

In various embodiments, storage module 1510 may be similar to storage module 810, with brief reference to FIG. 8, and may comprise a memory card, an internal memory, and/or the like. Storage module 1510 may be configured to store and maintain data files, including encrypted data files. The date files may comprise any suitable electronic file, such as, for example, text, audio, images, video, and/or the like. Communication module 1520 may be similar to communication module 820, with brief reference to FIG. 8, and may comprise one or more components capable of wireless communication, such as, for example, an 802.11 or 802.2(2) wireless chip, a Bluetooth® chip, an NFC chip, or the like. Communication module 1520 may also be configured to receive input from a user, via a touchscreen, keyboard, mouse, or the like. Processor 1530 may be similar to processor 830, with brief reference to FIG. 8, and may comprise any combination of hardware and/or software capable of providing instructions to storage module 1510, communication module 1520, and/or encryption module 1540. Processor 1530 may comprise a tangible non-transitory computer-readable memory having instructions stored on the memory to allow the components to perform various functions, as described herein.

In various embodiments, encryption module 1540 may comprise any combination of hardware and/or software and may be configured to encrypt and decrypt data files. Encryption module 1540 may comprise a sub-component of processor 1530, or may comprise a physically and/or logically distinct component of PSD 1500. Encryption module 1540 may be configured to perform various operations to encrypt and/or decrypt data, as discussed further herein.

In various embodiments, encryption module 1540 may comprise a math function list 1545. Math function list 1545 may comprise a database (e.g., relational, hierarchical, graphical, blockchain, or object-oriented structure), a flat file structure, and/or any other suitable data structure capable of storing and maintaining data. Math function list 1545 may contain one or more math functions. As used herein, a "math function" may refer to any suitable mathematical and reversible function that can be applied to alter data bytes. For example, an exemplary math function may comprise instructions to divide a byte by two (2) and generate random halves from the two bytes (e.g., a byte comprising a value of 100 would be divided into two separate bytes, and byte[0] may be assigned a value of 57 whereas byte[1] may be assigned a value of 43). Math function list 1545 may comprise any suitable number of math functions. The math functions in math function list 1545 may be ordered in a numerical order, with each math function being assigned a corresponding numerical value (e.g., an identifier) corresponding to the numerical ordering (e.g., 1, 2, 3, 4, etc.). In various embodiments, a user may interact with PSD 1500 to input additional math functions into math function list 1545 (via a secondary device in logical communication with PSD 1500, via direct input, or the like).

Figure 16:
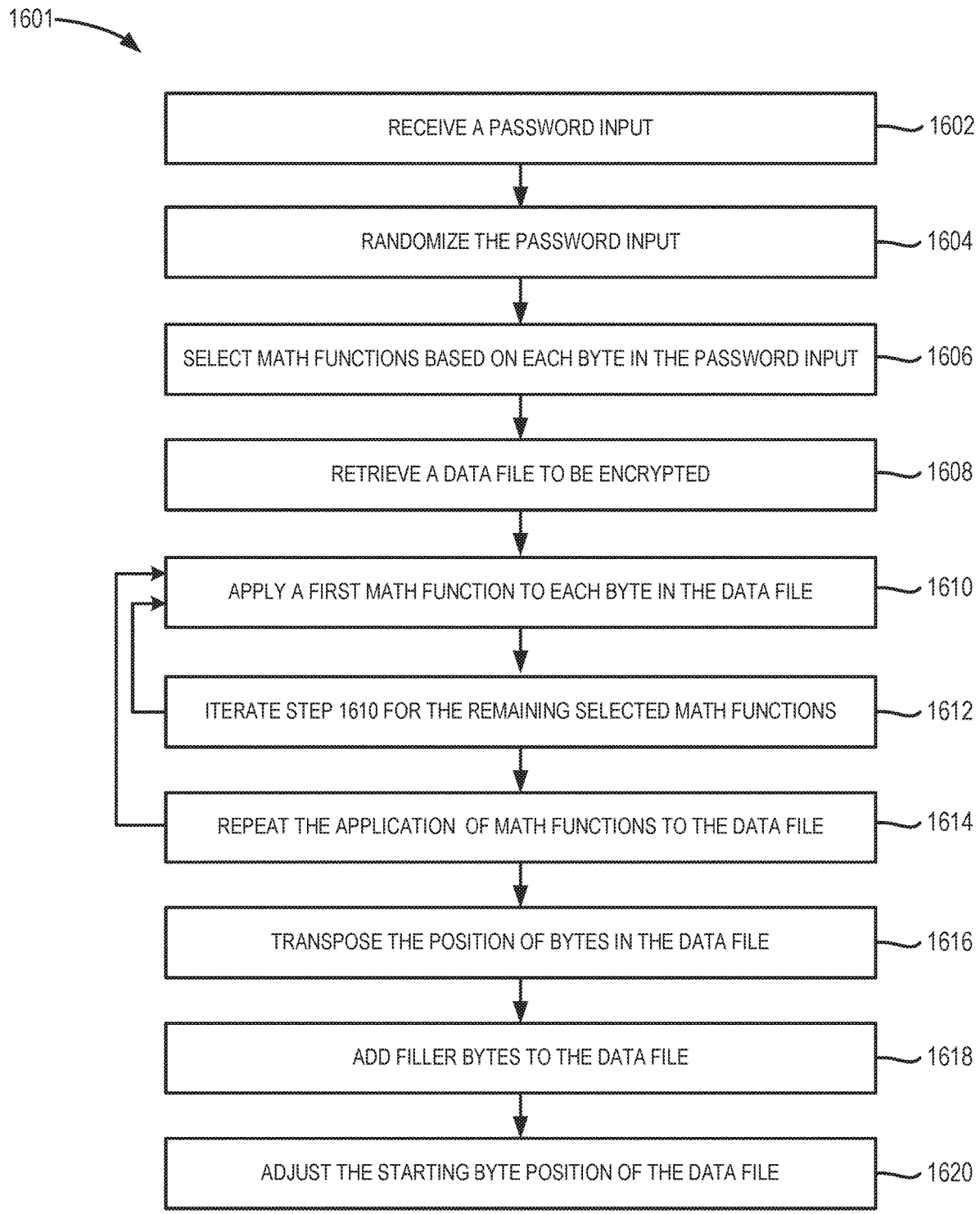
FIG. 16 illustrates a process flow for a method of encrypting data, according to various embodiments.

In various embodiments, and with reference to FIG. 16 and continued reference to FIG. 15, a method 1601 for encrypting data is disclosed. Although method 1601 refers to encrypting data on PSD 1500, it should be understood that the present steps and processes may be applied to data in any suitable environment, computer based system, database, or the like.

Method 1601 may comprise receiving a password input (step 1602). PSD 1500, via communication module 1520 or processor 1530, may be configured to receive the password input. The password input may comprise any suitable combination of letters, numbers, and symbols, and may be input to encrypt a data file, as discussed further herein. The password input may be input by a user via any suitable input device (e.g., keyboard, mouse, touchscreen, etc., or a secondary device in logical communication with PSD 1500). Processor 1530 may be configured to parse the password input to determine the number of bytes in the password input. Processor 1530 may also be configured to determine a decimal value of each byte. For example, a password input of "Hello1" comprises six (6) total bytes (e.g., "H" as byte[0], "e" as byte[1], "1" as byte[2], "1" as byte[3], "o" as byte[4], and "1" as byte[5]). Each byte may comprise a numerical value based on the American Standard Code for Information Interchange (ASCII) decimal value of each byte. For example, byte[0] corresponding to character "H" may comprise an ASCII decimal value of 72; byte[1] corresponding to character "e" may comprise an ASCII decimal value of 101; byte[2] corresponding to character "1" may comprise an ASCII decimal value of 108; byte[3] corresponding to character "1" may comprise an ASCII decimal value of 108; byte[4] corresponding to character "o" may comprise an ASCII decimal value of 111; and byte[5] corresponding to character "1" may comprise an ASCII decimal value of 49.

In various embodiments, method 1601 may comprise randomizing the password input (step 1604). Processor 1530 may be configured to randomize the password input. The password input may be randomized to vary the length of the password. Varying the password length may increase the strength of the encryption and partially reduce the correct guess of the password input by a third party or hacker. The password input may be randomized using any suitable technique. For example, processor 1530 may randomize the password input based on a comparison of the decimal values of each byte in the password input. In that regard, the password input may be randomized byte by byte. For example, beginning with byte[0] and looping through all of the bytes, in response to the decimal value byte[0] being greater than the decimal value byte[1], the decimal value of byte[0] may be added to the decimal value of byte[0], or in response to the decimal value byte[0] being less than or equal to the decimal value byte[1], the decimal value of byte[2] may be added to the decimal value of byte[0]; in response to the modulus of the decimal value of byte[0] with the decimal value of byte[2] being greater than the decimal value of byte[2], the decimal value of byte[0] is subtracted by the decimal value of byte[1], or in response to the modulus of the decimal value of byte[0] with the decimal value of byte[2] being less than or equal to the decimal value of byte[2], the decimal value of byte[0] is multiplied by 2; and/or the like. In that respect, all of the bytes in the password input may be randomized. In various embodiments, processor 1530 may implement modulus logic such that the decimal value of each byte is not randomized to a number greater than the list size of math function list 1545.

In various embodiments, method 1601 may comprise selecting math functions based on each byte in the password input (step 1606). Processor 1530 may be configured to transmit the password input, the byte data, and the decimal value data to encryption module 140. Encryption module 1540 may be configured to retrieve and select the math functions from math function list 1545. In that respect, each math function in math function list 1545 may be ordered in a numerical order, and each math function may be assigned a corresponding numerical value corresponding to the ordering (e.g., 1, 2, 3, 4, etc.). Encryption module 1540 may retrieve and select a math function for each byte in the password input based on the bytes decimal value. For example, given the above example relating to the data input of "Hello1," encryption module 1540 may select the math function assigned numerical value 72 for byte[0], the math function assigned numerical value 101 for byte[1], the math function assigned numerical value 108 for byte[2], the math function assigned numerical value 108 for byte[3], the math function assigned numerical value 111 for byte[4], and the math function assigned numerical value 49 for byte[5].

In various embodiments, method 1601 may comprise retrieving a data file to be encrypted (step 1608). Encryption module 1540 may be configured to retrieve the data file from storage module 1510. In various embodiments, the data file may also be input and received into PSD 1500, via communication module 1520 and/or processor 1530, and transmitted to encryption module 1540 for encryption.

In various embodiments, method 1601 may comprise applying a first math function to each byte in the data file (step 1610). Encryption module 1540 may be configured to apply the first math function (e.g., the math function selected based on byte[0] of the password) to each byte in the data file. For example, encryption module 1540 may apply the first math function to each byte in consecutive order (e.g., byte[0], byte[1], byte[2], etc.), until the first math function is applied all of the bytes in the data file.

In various embodiments, method 1601 may comprise iterating step 1610 for the remaining selected math functions (step 1612). In that respect, encryption module 1540 may be configured to continue applying the math functions to each byte in the data file until all of the selected math functions have been applied. For example, given the example of "Hello1" having six (6) total bytes, thus six (6) total selected math functions, encryption module 1540 may repeat step 1610 five (5) additional times to separately apply each math function selected in step 1606.

In various embodiments, method 1601 may comprise repeating the application of math functions to the data file (step 1614). Encryption module 1540 may be configured to repeat the application of math functions. Steps 1610, 1612 may be repeated any suitable and/or desirable number of times. For example, steps 1610, 1612 may be repeated based on a user input or a stored value. In various embodiments, steps 1610, 1612 may be repeated based on a decimal value of one of the bytes from the data input. For example, given the above example of "Hello1" wherein byte[2] comprises an ASCII decimal value of 108, steps 1610, 1612 may be repeated 108 times (e.g., all of the math functions are applied 108 times). Encryption module 1540 may be preconfigured to select a specific byte in the data input (e.g., byte[0], byte[1], etc.) to determine the number of times to repeat steps 1610, 1612.

In various embodiments, method 1601 may comprise transposing the position of bytes in the data file (step 1616). The byte positions in the data file may be transposed to partially prevent any relational patterns from being discovered in the encrypted data file. Encryption module 1540 may be configured to transpose the data file bytes. Encryption module 1540 may transpose the data file bytes using any suitable process. For example, the data file bytes may be transposed based on the password input bytes, such as, for example, by transposing the data file byte at the current position (starting with byte[0]) with the data file byte at the position offset of the current data file byte in the password input byte. For example, in response to the first byte in the password input comprising an ASCII decimal value of three (3), the first data file byte (e.g., byte[0]) may be transposed with the data file byte that is offset by three (3) bytes (e.g., byte[3]). As a further example, each byte may be transposed based on the ASCII decimal value of the byte. For example, in response to byte[0] comprising a decimal value of 3, byte[0] may be transposed with byte[2]; in response to byte[2] comprising a decimal value of 15, byte[2] may be transposed with byte[15]; and the like. In various embodiments, the data file bytes may continue to be transposed until every data file byte has been transposed. In various embodiments, the bytes may continue to be transposed based on a predetermined number of transpositions, or the like.

In various embodiments, method 1601 may comprise adding filler bytes to the data file (step 1618). Filler bytes may be added to the data file to ensure that the password input length or original data file length (e.g., before the process of method 1601 is applied) cannot be determined by the finished file size of the data file. Encryption module 1540 may be configured to add the filler bytes to the data file. The filler bytes may be added using any suitable process. For example, the filler bytes may be added based on a minimum file size and/or a maximum file size. The minimum file and/or the maximum file size may be specified by a user, and may comprise any suitable file size. In various embodiments, the maximum file size may be constrained by the free disk or memory space in storage module 1510. In various embodiments, encryption module 1540 may be configured to add filler bytes to the data file until the data file size is greater than the minimum file size and less than the maximum file size. In various embodiments, the filler bytes may be added based on the password input. For example, the decimal value of byte[0] may be multiplied with the decimal value of byte[1] from the password input to calculate the total number of filler bytes to add.

In various embodiments, method 1601 may comprise adjusting the starting position of the data file (step 1620). Encryption module 1540 may be configured to adjust the starting position of the data file. The starting position of the data file may be adjusted to partially protect against attacks by hackers or third parties on the initial file headers of the data file, or on the start position of the data file. The starting position of the data file may be adjusted using any suitable technique. For example, the starting position may be calculated and adjusted based on the password input, such as, for example, by calculating a starting position value. The start position value may be calculated by selecting a data byte from the password input to generate the starting position value.

In response to the modulus of byte[1] being greater than the decimal value of byte[2], the starting position value is multiplied by 5; in response to the modulus of byte[2] being less than the decimal value of byte[3], the starting position value is divided by 3, or in response to the modulus of byte[2] being greater than or equal to the decimal value of byte[3], the starting position value is multiplied by 2; in response to the modulus of byte[3] being 0 the starting position value is assigned a value of 0; in response to the decimal value of byte[4] being greater than byte[2] the starting position value is added to the decimal value of byte[4], byte[1], and byte[2] multiplied together; and/or the like. The starting point of the data file may be assigned based on the starting position value.

In various embodiments, the resulting encrypted data file may be stored in storage module 1510, or transmitted to any other suitable storage. In that respect, the encrypted data file may not comprise a known file extension (e.g., .exe, .pdf, etc.), and/or may not comprise the file extension of the original data file. In various embodiments, a random extension may be assigned to the encrypted data file. In various embodiments, PSD 1500 may comprise a file manager, graphic user interface, or other suitable software interface configured to allow users to track encrypted data files and the corresponding original data file and data name. In various embodiments, a data file list may be stored, maintained, and secured in storage module 1510 to track the encrypted data file and the corresponding original data file and data name.

In various embodiments, the encrypted data file may be decrypted using the same or similar steps as in method 1601. In that respect, in response to receiving a second password input, processor 1530 may randomize the second password input similar to the randomization in step 1604. Encryption module 1540 may adjust the starting byte position of the encrypted data file based on the second password input, similar to step 1618. Encryption module 1540 may remove the filler bytes from the encrypted data file based on the second password input, similar to step 1616. Encryption module 1540 may retrieve math function list 1545 and select math functions based on the second password input's bytes, similar to step 1606. Encryption module 1540 may apply each selected math function to each byte in the data file and repeat the application of the match functions based on the second password input's bytes, in the reverse of steps 1610, 1612, and 1614. In that regard, the encrypted data file may be decrypted. In response to the second password input matching the password input, the decrypted data file will be the same as the original data file. In response to the second password input not matching the password input, the decrypted data file will not be the same as the original data file.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As used herein, "transmit" may include sending at least a portion of electronic data from one component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the components discussed herein may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g., IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.), a uniform resource locator ("URL"), a document (e.g., a MICROSOFT® Word™ document, a MICROSOFT® Excel® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may include at least one of a social media site, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of mobile device communications include texting, email, and mobile applications for smartphones.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

The terms "computer program medium" and "computer usable medium" and "computer readable medium" are used to generally refer to media such as removable storage drive and a hard disk installed in hard disk drive. These computer program products provide software to computer system.

The computer system may also include a communications interface. Communications interface allows software and data to be transferred between computer system and external devices. Examples of communications interface may include a modem, a network interface (such as an Ethernet card), a communications port, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, components, modules, and/or engines described herein may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer based systems or the like may communicate with the server via a web client. The web client includes any device or software which communicates via any network, such as, for example any device or software discussed herein. The web client may include internet browsing software installed within a computing unit or system to conduct communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any database, data structure, or the like discussed herein may include relational, hierarchical, graphical, blockchain, object-oriented structure, and/or any other database configurations. Any database, data structure, or the like may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The systems and methods may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements described herein may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The systems described herein may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
   a processor; and
   a tangible, non-transitory memory configured to communicate with the processor, the tangible, non-transitory memory having instructions stored thereon that, in response to execution by the processor, cause the processor to perform operations comprising:
   determining, by the processor, a number of bytes in a password input, wherein each byte comprises a decimal value;
   retrieving, by the processor, a first math function based on the decimal value of a first byte in the password input;
   applying, by the processor, the first math function to each byte in a data file;
   implementing, by the processor, a standardized communication protocol, wherein the standardized communication protocol defines a datagram comprising a standardized communication protocol header interposed between a physical layer communication protocol and a transport layer protocol; and
   sending, by the processor, the data file via the standardized communication protocol.

2. The system of claim 1, further comprising:
   retrieving, by the processor, a second math function based on the decimal value of a second byte in the password input; and
   applying, by the processor, the second math function each byte in the data file.

3. The system of claim 2, further comprising repeating, by the processor, the application of the first math function and the second math function to each byte in the data file, wherein the application is repeated based on a user input, a stored value, or the decimal value of a selected byte from the password input.

4. The system of claim 1, further comprising transposing, by the processor, a position of bytes in the data file based on the decimal value of at least one byte from the password input.

5. The system of claim 1, further comprising adding, by the processor, filler bytes into the data file, wherein a number of filler bytes added into the data file is based on at least one of a minimum file size, a maximum file size, or a decimal value of at least one byte from the password input.

6. The system of claim 1, further comprising adjusting, by the processor, a starting byte position of the data file based on the decimal value of at least one byte from the password input.

7. The system of claim 1, further comprising assigning, by the processor, a random file extension to the data file.

8. The system of claim 1, wherein the math function comprises a reversible function configured to alter the data bytes in the data file to at least one of encrypt or decrypt the data file.

9. A portable storage device (PSD), comprising:
   a processor;
   an encryption module comprising a math function list, wherein the encryption module is configured to receive instructions from the processor, and wherein the math function list comprises math functions stored in a numerically ordered list; and
   a tangible, non-transitory memory configured to communicate with the processor, the tangible, non-transitory memory having instructions stored thereon that, in response to execution by the processor, cause the encryption module to perform operations comprising:
   retrieving, by the encryption module, a plurality of math functions from the math function list, wherein the plurality of math functions are retrieved based on a password input;
   applying, by the encryption module, the plurality of math functions to each byte in a data file;
   transposing, by the processor, a position of bytes in the data file;
   adding, by the processor, filler bytes into the data file;
   adjusting, by the processor, a starting byte position of the data file;

implementing, by the processor, a standardized communication protocol, wherein the standardized communication protocol defines a datagram comprising a standardized communication protocol header interposed between a physical layer communication protocol and a transport layer protocol; and sending, by the processor, the data file via the standardized communication protocol.

10. The PSD of claim 9, further comprising:
determining, by the encryption module, a number of bytes in the password input; and
determining, by the encryption module, a decimal value of each byte in the password input, wherein the decimal value is based on an American Standard Code for Information Interchange (ASCII) decimal value of each byte.

11. The PSD of claim 10, further comprising randomizing, by the encryption module, the password input, wherein the password input is randomized by at least one of varying the length of the password, transposing a position of bytes in the password input based on the decimal value of each byte, or adding or subtracting the decimal value of one or more bytes based on a comparison of the decimal value of each byte.

12. The PSD of claim 11, wherein the password input is randomized based on modulus logic limiting the decimal value of each byte during the randomization to a number less than the numerically ordered list of the plurality of math functions.

13. The PSD of claim 10, wherein each math function of the plurality of math functions is assigned to a numerical value in numerically ordered list, and wherein the plurality of math functions are retrieved by retrieving the math function having the numerical value matching the decimal value of each byte in the password input.

14. The PSD of claim 9, wherein applying the plurality of math functions to each byte in the data file comprises iteratively applying each math function of the plurality of math functions to each byte in the data file.

15. The PSD of claim 14, further comprising repeating, by the encryption module, the iterative application of each of the plurality of math functions to each byte in the data file, wherein the iterative application is repeated based on a user input, a stored value, or the decimal value of a selected byte from the password input.

16. The PSD of claim 9, further comprising:
a storage module in electronic communication with the processor; and
a communication module in electronic communication with the processor, wherein the data file is retrieved from the storage module or received from the communication module.

17. A method of encrypting a data file, comprising:
retrieving, by a processor, a plurality of math functions based on a password input;
applying, by the processor, the plurality of math functions to each byte in the data file, wherein each math function of the plurality of math functions are iteratively applied to each byte in the data file;
transposing, by the processor, a position of bytes in the data file based on the password input;
adding, by the processor, filler bytes into the data file based on the password input;
adjusting, by the processor, a starting byte position of the data file based on the password input;
implementing, by the processor, a standardized communication protocol, wherein the standardized communication protocol defines a datagram comprising a standardized communication protocol header interposed between a physical layer communication protocol and a transport layer protocol; and
sending, by the processor, the data file via the standardized communication protocol.

18. The method of claim 17, further comprising repeating, by the processor, the iterative application of each of the plurality of math functions to each byte in the data file based on a user input, a stored value, or a decimal value of a selected byte from the password input.

19. The method of claim 17, wherein the position of bytes in the data file are transposed based on the decimal value of the byte, and wherein the position of bytes in the data file are transposed until each byte of the data file has been transposed or based on a predetermined number of transpositions.

20. The method of claim 17, wherein a number of the filler bytes added into the data file is based on at least one of a minimum file size, a maximum file size, or a decimal value of at least one byte from the password input, and wherein the starting byte position is adjusted based on the decimal value of at least one byte from the password input.

* * * * *